(12) United States Patent
Schreck et al.

(10) Patent No.: US 11,562,769 B1
(45) Date of Patent: Jan. 24, 2023

(54) TAPE ASSEMBLIES HAVING MOVABLE REEL CONFIGURATIONS FOR MAGNETIC RECORDING DEVICES

(71) Applicant: Western Digital Technologies, Inc., San Jose, CA (US)

(72) Inventors: Erhard Schreck, San Jose, CA (US); Robert Smith, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/824,700

(22) Filed: May 25, 2022

(51) Int. Cl.
*G11B 23/087* (2006.01)
*G11B 23/04* (2006.01)
*G11B 15/32* (2006.01)

(52) U.S. Cl.
CPC ........ *G11B 23/08778* (2013.01); *G11B 15/32* (2013.01); *G11B 23/044* (2013.01); *G11B 23/08728* (2013.01); *G11B 23/08757* (2013.01)

(58) Field of Classification Search
None
See application file for complete search history.

(56) References Cited

U.S. PATENT DOCUMENTS

| | | | |
|---|---|---|---|
| 4,469,292 A * | 9/1984 | Mangold | G11B 23/087 242/336 |
| 4,635,155 A | 1/1987 | Georgens et al. | |
| 5,314,141 A * | 5/1994 | Ishii | G11B 15/67547 |
| 5,326,048 A | 7/1994 | Kim | |
| 5,501,536 A * | 3/1996 | Kleve | B41J 32/00 400/208 |
| 5,598,984 A * | 2/1997 | Lee | G11B 15/32 242/336 |
| 5,730,380 A * | 3/1998 | Hong | G11B 25/066 242/336 |
| 5,803,388 A | 9/1998 | Saliba et al. | |
| 5,881,960 A | 3/1999 | Christie | |
| 5,901,914 A * | 5/1999 | Matsuoka | G11B 25/066 242/336 |
| 6,024,314 A * | 2/2000 | Dannegger | G11B 25/066 242/336 |
| 6,155,509 A * | 12/2000 | d'Alayer de Costemore d'Arc | G11B 25/066 242/336 |

(Continued)

FOREIGN PATENT DOCUMENTS

WO 2021201901 A1 10/2021

OTHER PUBLICATIONS

"IBM TS4500 Tape Library Supports IBM Ultrium Linear Tape—Open (LTO) 9 Tape Drive Technology." IBM United States Hardware Announcement 121-069, Sep. 7, 2021, 20 pages, <https://www.ibm.com/common/ssi/cgi-bin/ssialias?appname=skmwww&htmlfid=897%2FENUS121-069&infotype=AN&subtype=CA&mhsrc=ibmsearch_a&mhq=lto-9>.

*Primary Examiner* — Jefferson A Evans
(74) *Attorney, Agent, or Firm* — Patterson & Sheridan, LLP; Steven H. VerSteeg

(57) ABSTRACT

The present disclosure generally relates to tape assembly implementations for magnetic recording devices, such as tape embedded drives (TEDs). In one or more embodiments, one or more of a first reel and/or a second reel is laterally movable relative to a side wall of a casing of the tape assembly. In one or more embodiments, a drive assembly laterally moves the first reel and the second reel substantially simultaneously such that a spindle distance between a first spindle and a second spindle is substantially constant.

13 Claims, 15 Drawing Sheets

(56) References Cited

U.S. PATENT DOCUMENTS

| | | | |
|---|---|---|---|
| 6,270,031 B1 * | 8/2001 | Collins | G11B 23/08757 |
| | | | 242/346.1 |
| 6,739,538 B2 | 5/2004 | Alexander | |
| 6,786,445 B1 | 9/2004 | Todd et al. | |
| 6,801,395 B1 * | 10/2004 | Le Roux | G11B 23/093 |
| 7,097,125 B2 * | 8/2006 | Painter | G11B 31/02 |
| | | | 242/336 |
| 7,349,181 B2 | 3/2008 | Argumedo et al. | |
| 9,500,265 B2 * | 11/2016 | Pittini | F16H 19/04 |
| 10,997,998 B1 | 5/2021 | Uefune et al. | |
| 11,081,132 B1 | 8/2021 | Chew | |
| 2001/0015873 A1 * | 8/2001 | Solomon | G11B 23/107 |
| 2004/0140392 A1 | 7/2004 | Saliba | |
| 2004/0264029 A1 | 12/2004 | Painter | |

* cited by examiner

TAPE ASSEMBLIES HAVING MOVABLE REEL CONFIGURATIONS FOR MAGNETIC RECORDING DEVICES

BACKGROUND OF THE DISCLOSURE

Field of the Disclosure

Embodiments of the present disclosure generally relate to tape assembly implementations for magnetic recording devices, such as tape embedded drives (TEDs).

Description of the Related Art

Tape data storage is a system for storing digital information on magnetic tape using digital recording. Tape storage media is more commonly packaged in cartridges and cassettes. A tape drive performs writing or reading of data in the cartridges or cassettes. A common cassette-based format is LTO, which comes in a variety of densities.

Tape drives operate by using a tape head to record and read back information from tapes by magnetic processes. The tape head can have servo elements and data elements that are arranged in an array that is oftentimes referred to as a tape head array.

Magnetic recording devices can have several limitations that affect device performance. For example, devices can be limited in terms of media capacity (such as tape capacity, e.g., tape length). As another example, devices can be limited by operational footprint (e.g., the size of the devices). It can be difficult to enhance these limitations without affecting operational parameters. For example, attempts to enhance media capacity can deform the media, hinder media tensioning, and/or reduce performance (such as recording speed). The limitations can also be negatively correlated with respect to each other. As an example, it can be difficult to increase media capacity without increasing the footprint of the device beyond a certain level.

Therefore, there is a need in the art for magnetic recording devices that enhance media capacity and/or recording operations while mitigating or reducing footprints.

SUMMARY OF THE DISCLOSURE

The present disclosure generally relate to tape assembly implementations for magnetic recording devices, such as tape embedded drives (TEDs). In one or more embodiments, one or more of a first reel and/or a second reel is laterally movable relative to a side wall of a casing of the tape assembly. In one or more embodiments, a drive assembly laterally moves the first reel and the second reel substantially simultaneously such that a spindle distance between a first spindle and a second spindle is substantially constant.

In one implementation, a magnetic recording device includes a casing and a first reel mounted to a first spindle within the casing. The first reel is rotatable. The magnetic recording device includes a second reel mounted to a second spindle within the casing. The second reel is rotatable. The magnetic recording device includes a tape media wound at least partially about one or more of the first reel or the second reel. Rotation of one or more of the first reel or the second reel transfers the tape media between the first reel and the second reel. One or more of the first reel or the second reel is laterally movable relative to a side wall of the casing. The magnetic recording device includes a controller configured to control lateral movement of the one or more of the first reel or the second reel.

In one implementation, a magnetic recording device includes a casing and a first reel mounted to a first spindle within the casing. The first reel is rotatable. The magnetic recording device includes a second reel mounted to a second spindle within the casing. The second reel is rotatable. The tape media is wound at least partially about one or more of the first reel or the second reel, and rotation of one or more of the first reel or the second reel transfers the tape media between the first reel and the second reel. The magnetic recording device includes a drive assembly configured to laterally move the first reel and the second reel. The magnetic recording device includes a controller having instructions that, when executed, cause the drive assembly to laterally move the first reel and the second reel substantially simultaneously such that a spindle distance between the first spindle and the second spindle is substantially constant.

In one implementation, a magnetic recording device includes a casing, reeling means positioned within the casing, and a tape media wound at least partially about the reeling means. The magnetic recording device includes means for laterally moving the reeling means relative to a side wall of the casing.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relate to tape assembly implementations for magnetic recording devices, such as tape embedded drives (TEDs). In one or more embodiments, one or more of a first reel and/or a second reel is laterally movable relative to a side wall of a casing of the tape assembly. In one or more embodiments, a drive assembly laterally moves the first reel and the second reel substantially simultaneously such that a spindle distance between a first spindle and a second spindle is substantially constant. Additionally, in one or more embodiments, a first reel and a second reel are mounted at stationary positions. One or more of the first reel and/or the second reel includes a hub mounted to a spindle, and a single flange extending relative to the hub. Moreover, in one or more embodiments, one or more of a first reel and/or a second reel each includes a flangeless hub mounted to a spindle.

Figure 1A:
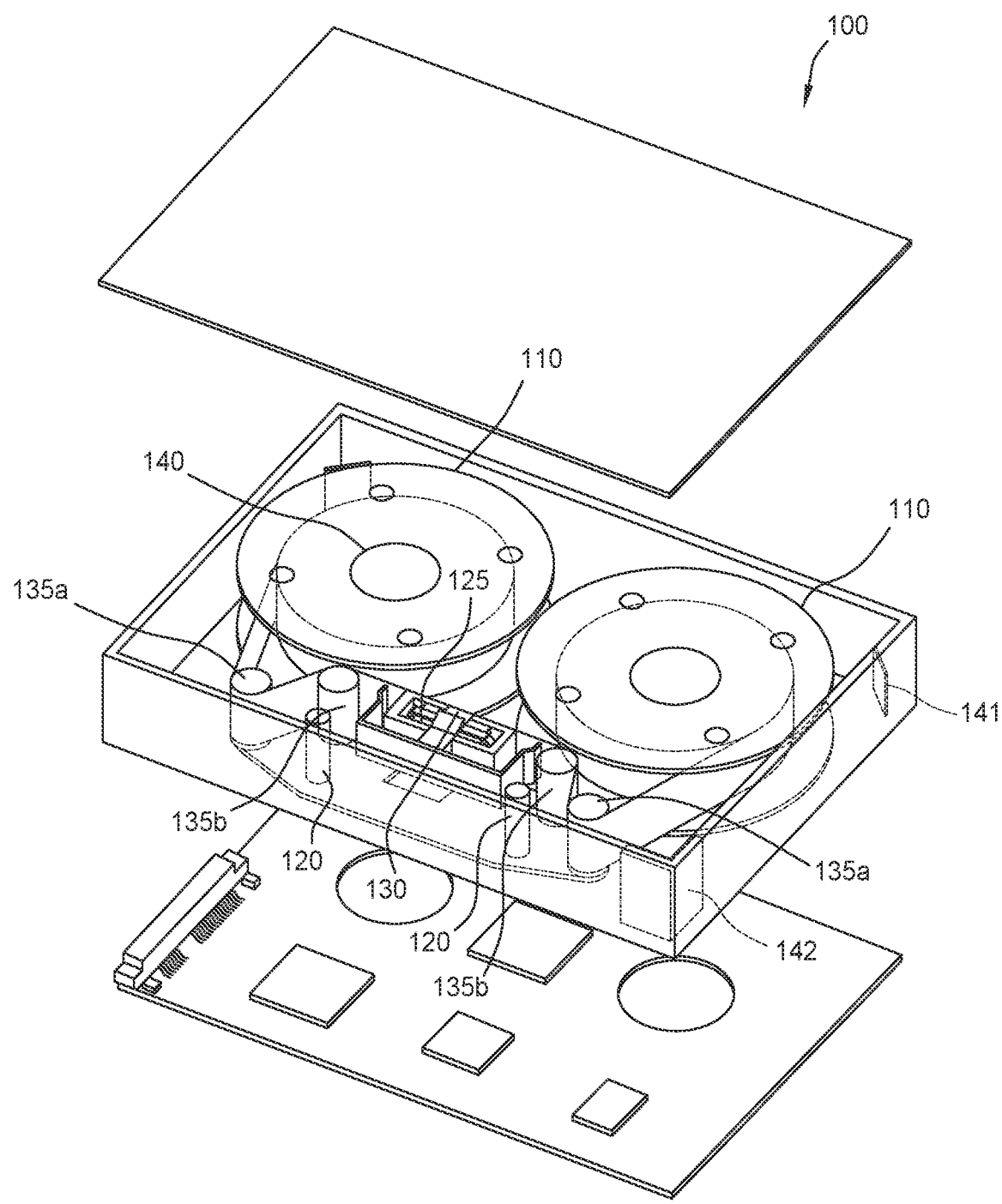
FIG. 1A illustrates a schematic perspective exploded view of a storage device 100, according to one implementation.

FIG. 1A illustrates a schematic perspective exploded view of a storage device 100, according to one implementation. The storage device 100 is a magnetic media drive, particularly a tape embedded drive (TED). The storage device 100 will be referred to as the tape embedded drive 100 hereafter. In one or more embodiments, the tape embedded drive 100 has a linear tape open (LTO) format.

Figure 1B:
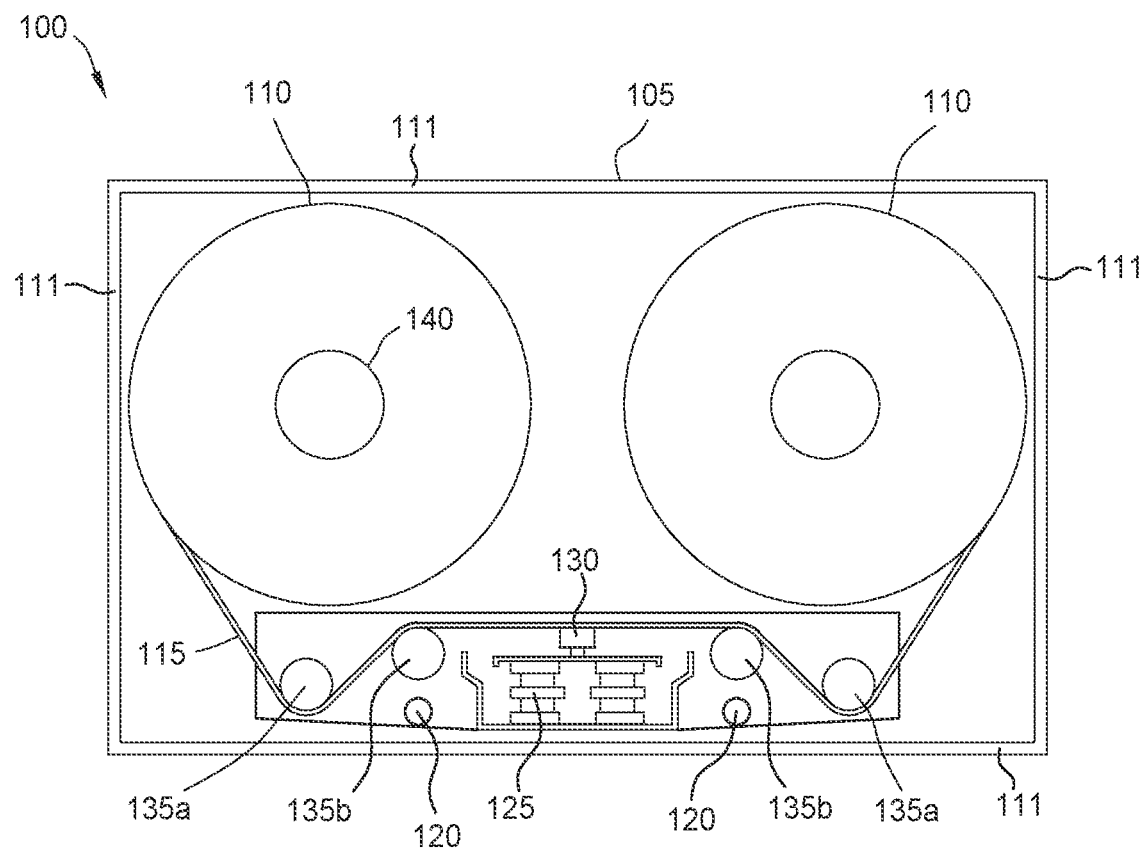
FIG. 1B illustrates a schematic top-down view of the tape embedded drive 100 illustrated in FIG. 1A, according to one implementation.

FIG. 1B illustrates a schematic top-down view of the tape embedded drive 100 illustrated in FIG. 1A, according to one implementation.

Figure 1C:
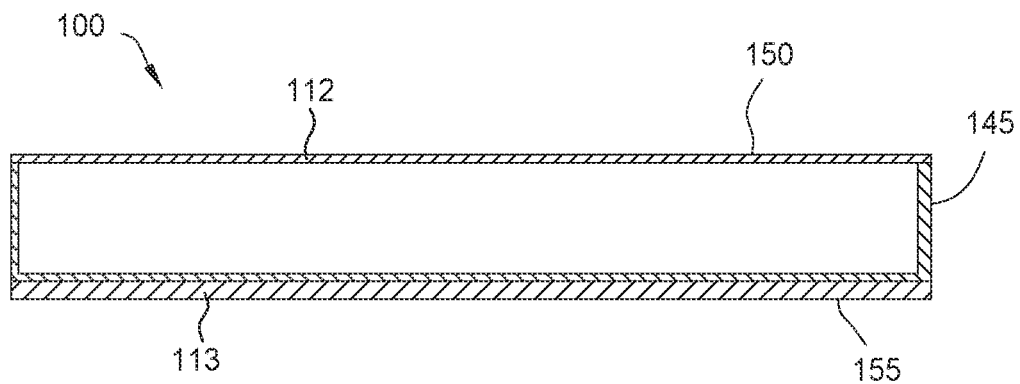
FIG. 1C illustrates a schematic side profile view of the tape embedded drive 100 illustrated in FIG. 1A, according to one implementation.

FIG. 1C illustrates a schematic side profile view of the tape embedded drive 100 illustrated in FIG. 1A, according to one implementation.

Focusing on FIG. 1B, for example, the tape embedded drive 100 includes a casing that includes a casing 105, one or more tape reels 110, one or more rotors (e.g., a stepping motor 120 (also known as a stepper motor), a voice coil motor (VCM) 125, a head assembly 130 with one or more read heads and one or more write heads, and tape guides/rollers 135a, 135b. Focusing on FIG. 1C, for example, the tape embedded drive 100 also includes a printed circuit board assembly 155 (PCBA). In one embodiment, which can be combined with other embodiments, most of the components are within an interior cavity of the casing 105, except the PCBA 155, which is mounted on an external surface of the casing 105. The same components are illustrated in a perspective view in FIG. 1A.

In the illustrated implementations, two tape reels 110 are placed in the interior cavity of the casing 105, with a center of each of the two tape reels 110 on the same level in the cavity. As shown in FIGS. 1A and 1B, the head assembly 130 is located between and below the two tape reels 110. Tape reel motors configured to rotate the spindles of the tape reels 110 can operate to wind and unwind the tape media 115 into and out of the tape reels 110. Each tape reel 110 may also incorporate a tape folder to help the tape media 115 be neatly wound onto the respective tape reel 110. The tape media 115 may be made via a sputtering process to provide improved areal density. The tape media 115 includes two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels 110 are biased against the guides/rollers 135a, 135b (collectively referred to as guides/rollers 135) and are movably passed along the head assembly 130 by movement of the reels. The illustrated embodiment shows four guides/rollers 135a, 135b, with the two guides/rollers 135a furthest away from the head assembly 130 serving to change direction of the tape media 115 and the two guides/rollers 135b closest to the head assembly 130 serving to reduce any bend(s) of the tape media 115 to facilitate pressing the tape media 115 against the head assembly 130 in a substantially planar manner. In one embodiment, which can be combined with other embodiments, the guides/rollers 135 utilize the same structure, as shown in FIG. 1A. In one embodiment, which can be combined with other embodiments, the guides/rollers 135 may have more specialized shapes and differ from each other based on function, as shown in FIG. 1B. A lesser or a greater number of rollers may be used. For example, the two function rollers may be cylindrical in shape, while the two functional guides may be flat-sided (e.g., rectangular prism) or clip shaped with two prongs and the film moving between the prongs of the clip. The guides/rollers 135a, 135b can be movable or stationary relative to the casing 105.

The voice coil motor 125 and the stepping motor 120 may variably position the tape head(s) transversely with respect to the width of the recording tape (e.g., the tape media 115).

The stepping motor 120 may provide coarse movement, while the voice coil motor 125 may provide finer actuation of the head(s) of the head assembly 130. In one embodiment, which can be combined with other embodiments, servo data may be written to the tape media 115 to aid in more accurate position of the head(s) along the tape media 115.

The casing 105 includes one or more particle filters 141 and/or desiccants 142, as illustrated in FIG. 1A, to help maintain the environment in the casing 105. For example, if the casing 105 is not airtight, the particle filters 141 may be placed where airflow is expected. The particle filters 141 and/or desiccants 142 may be placed in one or more of the corners or any other convenient place away from the moving internal components. For example, the moving tape reels 110 may generate internal airflow as the tape media 115 winds/unwinds, and the particle filters 141 may be placed within that airflow.

There is a wide variety of possible placements of the internal components of the tape embedded drive 100 within the casing 105. In particular, as the head assembly 130 is internal to the casing 105 in certain examples, the tape media 115 may not be exposed to the outside of the casing 105. Thus, the tape media 115 does not need to be routed along the edge of the casing 105 and can be freely routed in more compact and/or otherwise more efficient ways within the casing 105. Similarly, the head(s) and tape reels 110 may be placed in a variety of locations to achieve a more efficient layout, as there are no design requirements to provide external access to these components. The present disclosure contemplates that the configurations of FIGS. 1A-1C can be rearranged. For example, the head assembly 130 and the voice coil motor 125 can be moved to the other side if the tape media 115 (relative to what is shown in FIGS. 1A and 1B) in a mirrored manner. As another example, the guides/rollers 135a and/or the guides/rollers 135b can be moved to the other side if the tape media 115 (relative to what is shown in FIGS. 1A and 1B) in a mirrored manner.

The casing 105 includes four side walls 111. As illustrated in FIG. 1C, the casing 105 includes a cover 150 and a base 145. In the implementation shown, the cover 150 includes a top wall 112 and the base 145 includes a bottom wall 113. The PCBA 155 is attached to the bottom, on an external surface of the casing 105, opposite the cover 150. As the PCBA 155 is made of solid state electronics, environmental issues are less of a concern, so it does not need to be placed inside the casing 105. That leaves room inside the casing 105 for other components, particularly, the moving components and the tape media 115 that would benefit from a more protected environment.

In one embodiment, which can be combined with other embodiments, the tape embedded drive 100 is sealed. Sealing can mean the tape embedded drive 100 is hermetically sealed or simply enclosed without necessarily being airtight. Sealing the drive may be beneficial for tape film winding stability, tape film reliability, and tape head reliability. Desiccant may be used to limit humidity inside the casing 105.

In one embodiment, which can be combined with other embodiments, the cover 150 is used to hermetically seal the tape embedded drive 100. For example, the tape embedded drive 100 may be hermetically sealed for environmental control by attaching (e.g., laser welding, adhering using adhesive, etc.) the cover 150 to the base 145. The tape embedded drive 100 may be filled by helium, nitrogen, hydrogen, or any other typically inert gas.

In one embodiment, which can be combined with other embodiments, other components may be added to the tape embedded drive 100. For example, a pre-amp for the heads of the head assembly 130 may be added to the tape embedded drive 100. The pre-amp may be located on the PCBA 155, in the head assembly 130, or in another location. In general, placing the pre-amp closer to the heads may have a greater effect on the read and write signals in terms of signal-to-noise ratio (SNR). In one embodiment, which can be combined with other embodiments, some of the components may be omitted. For example, the particle filters 141 and/or the desiccant 142 may be omitted.

Figure 2A:
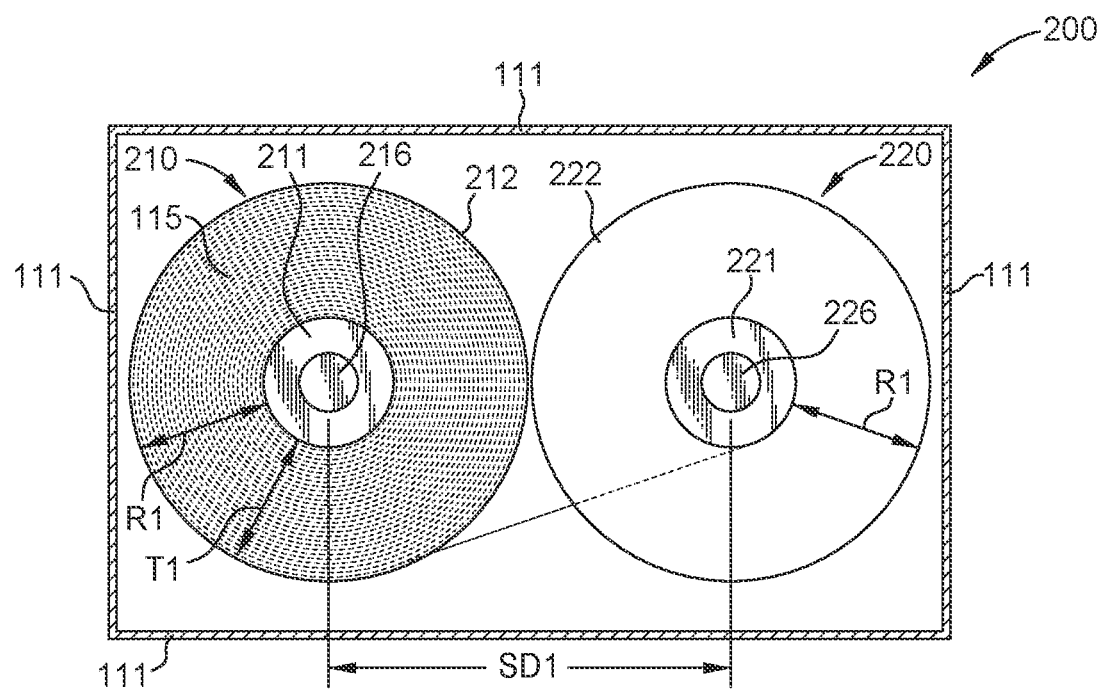
FIGS. 2A and 2B are schematic top views of a tape assembly 200, according to one implementation.
Figure 2B:
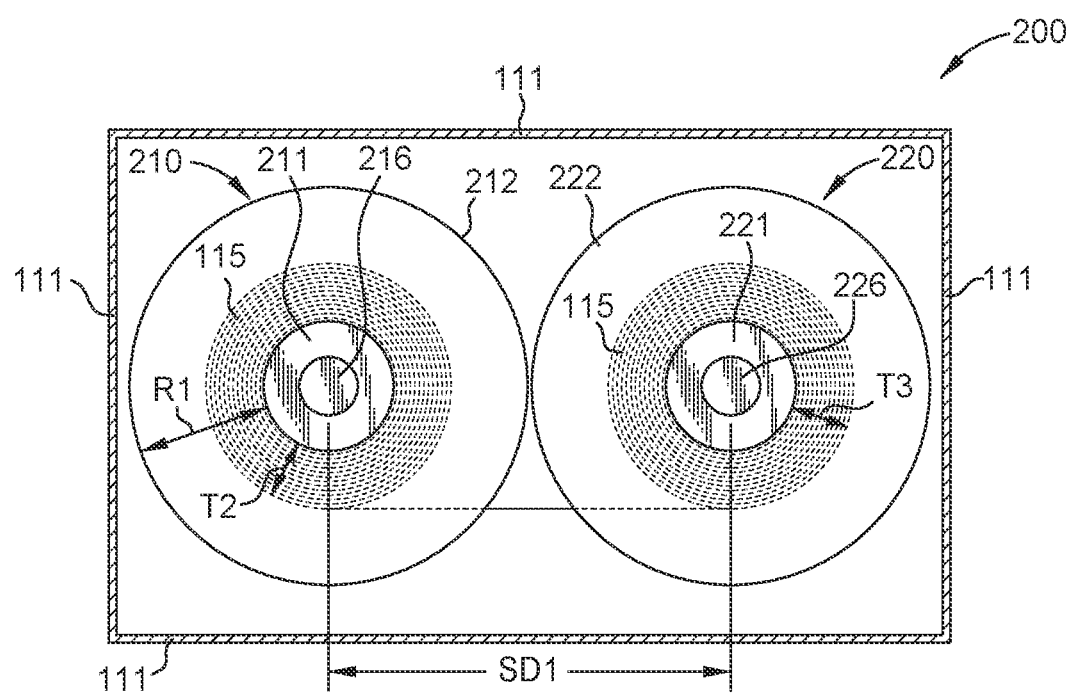

FIGS. 2A and 2B are schematic top views of a tape assembly 200, according to one implementation. The tape assembly 200 includes a first reel 210 and a second reel 220. Each reel 210, 220 includes a spindle 216, 226, a hub 211, 221, and flanges 212, 222. FIG. 2A shows a loaded position where the tape media 115 is completely reeled onto the first reel 210. The loaded position defines a tape load thickness T1 of the tape media 115. The flanges 212, 222 have a flange radius R1 (relative to the respective hubs 211, 221) that is equal to or greater than the tape load thickness T1. In the loaded position shown in FIG. 2A, portions of the tape media 115 can be disposed about the guides/rollers 15A, 135B and adjacent to the head assembly 130. The tape media 115 can also be coupled to the second reel 220 to facilitate initiating a reeling operation that reels the tape media 115 onto the second reel 220.

FIG. 2B shows a 50:50 position where a tape thickness T2 of tape media 115 reeled onto the first reel 210 is substantially equal to a tape thickness T3 of tape media 115 reeled onto the second reel 220.

Figure 3A:
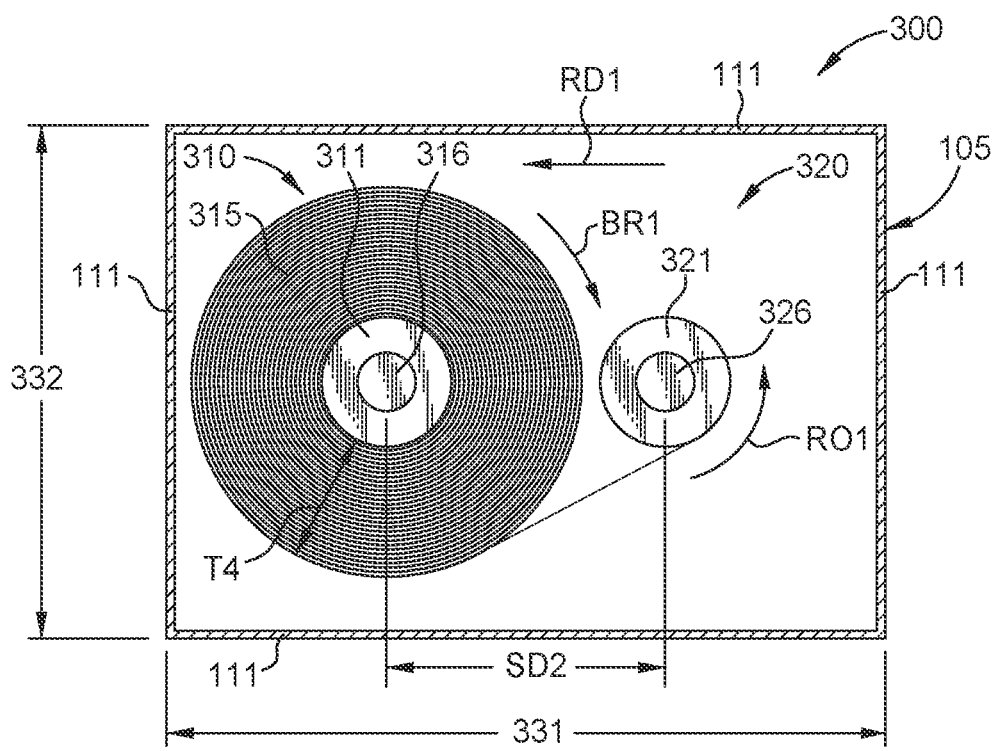
FIGS. 3A and 3B are schematic top views of a tape assembly 300 having flangeless reels 310, 320, according to one implementation.
Figure 3B:
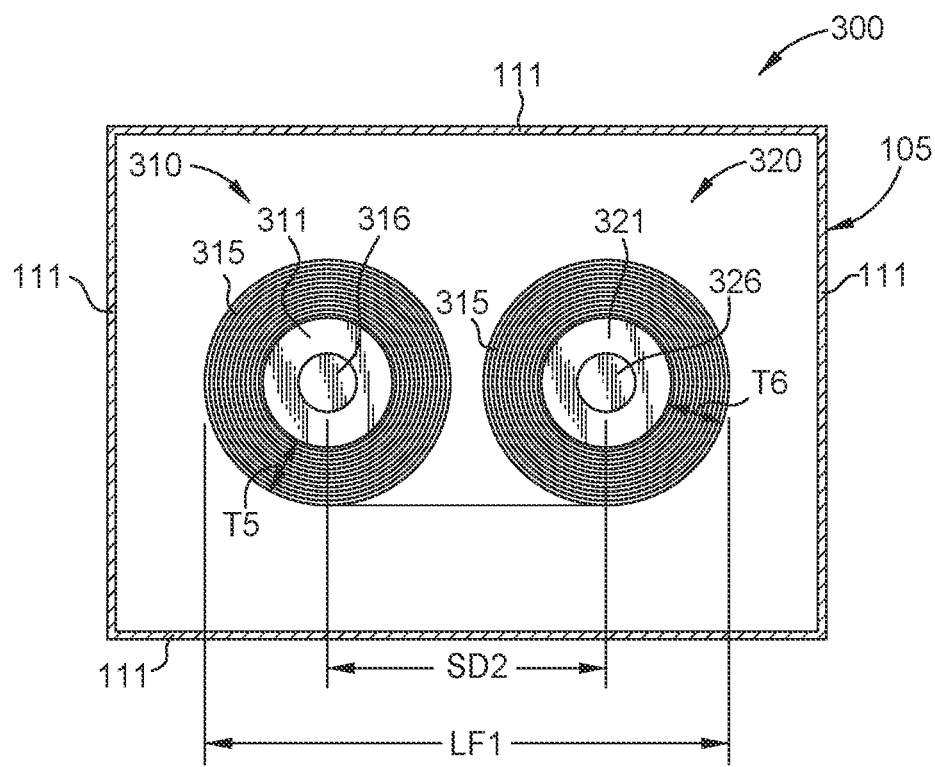

FIGS. 3A and 3B are schematic top views of a tape assembly 300 having flangeless reels 310, 320, according to one implementation. The tape assembly 300 is for magnetic recording devices. The tape assembly 300 includes the casing 105 and a first reel 310 mounted to a first spindle 316 within the casing 105. The first reel 310 is rotatable and includes a first flangeless hub 311 mounted to the first spindle 316. The tape assembly 300 includes a second reel 320 mounted to a second spindle 326 within the casing 105. The second reel 320 is rotatable and includes a second flangeless hub 321 mounted to the second spindle 326. A tape media 315 is wound at least partially about one or more of the first reel 310 and/or the second reel 320.

FIG. 3A shows a loaded position where the tape media is completely reeled onto the first reel 310. The loaded position defines a tape load thickness T4. The tape load thickness T4 is larger than the tape load thickness T1 shown in FIG. 2A, which reflects a longer tape length for the tape media 315. The longer tape length facilitates a larger tape capacity and recording capacity for the tape assembly 300.

Rotation of one or more of the first reel 310 and/or the second reel 320 transfers the tape media 115 between the first reel 310 and the second reel 320 in a reeling direction RD1. In the implementation shown in FIGS. 3A and 3B, the tape media 315 is transferred from the first reel 310 and to the second reel 320.

During a recording operation (which can include writing and/or reading), the tape media 315 is transferred from first reel 310 and to the second reel 320 in the reeling direction RD1. The second tape reel 320 onto which the tape media 315 is wound is rotated in a rotation direction RO1. The tape reel 310 from which the tape media 315 is transferred is biased in a brake direction BR1 that is opposite of the rotation direction RO1 in order to provide braking to facilitate maintaining tension on the tape media 315 during the recording operation.

FIG. 3B shows a 50:50 position where a tape thickness T5 of tape media 315 reeled onto the first reel 310 is substantially equal (e.g., within a difference of 5% or less) to a tape thickness T6 of tape media 115 reeled onto the second reel 320. That is, during the recording operation about half of the tape media 315 wound about the first flangeless hub 311 in FIG. 3A is reeled to be wound about the second flangeless hub 321. The tape thicknesses T5, T6 shown in FIG. 3B are both lesser than the tape thicknesses T2, T3 shown in FIG. 2B.

The tape assembly 300 shown in FIGS. 3A and 3B exhibits a greater tape capacity (and recording capacity) than the tape assembly 200 shown in FIGS. 2A and 2B, at a footprint area that is substantially equal to or lesser than a footprint area of the tape assembly 200. The footprint area is determined by multiplying an x-dimension 331 of the tape assembly 300 by a y-dimension 332.

Using the flangeless hubs 311, 321, a spindle distance SD2 between the first spindle 316 and the second spindle 326 can be used that is smaller than a spindle distance SD1 shown in FIGS. 2A and 2B. The spindle distances described herein are measured between geometric centers of the respective spindles. Using a smaller spindle distance facilitates using a smaller x-dimension 331, which facilitates a smaller footprint area for the tape assembly 300.

A lateral footprint LF1 of the first reel 310, the second reel 320, and the tape media 315 is less than 100 mm, and the lateral footprint LF1 is measured parallel to the reeling direction RD1. In one or more embodiments, the lateral footprint LF1 is 98 mm or less, such as about 91.3 mm or less.

Figure 3C:
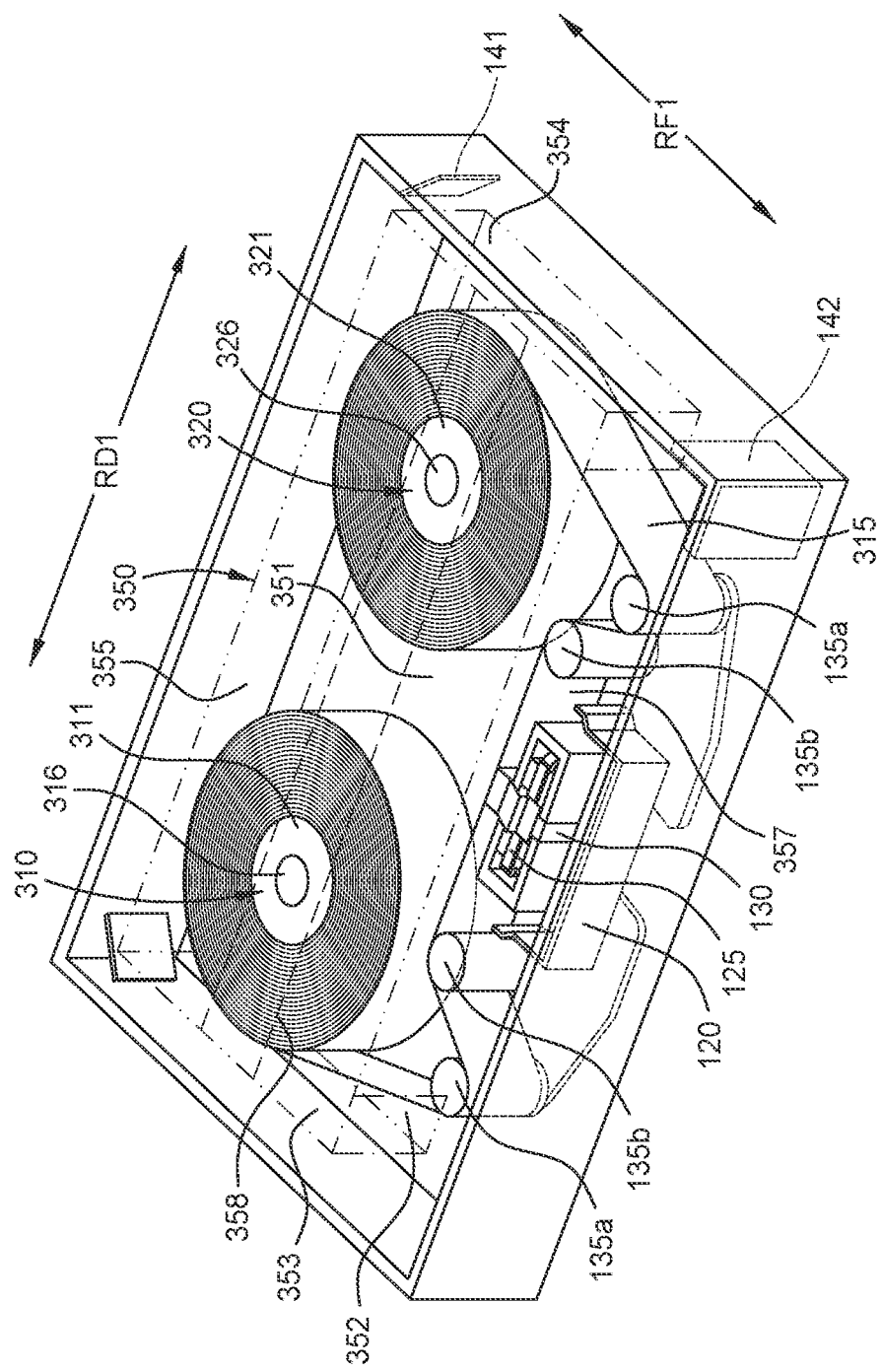
FIG. 3C is a schematic perspective view of the tape assembly 300 shown in FIGS. 3A and 3B, according to one implementation.

FIG. 3C is a schematic perspective view of the tape assembly 300 shown in FIGS. 3A and 38, according to one implementation. In the implementation shown in FIG. 3C, the tape assembly 300 includes a stop plate 350 mounted at a stationary position on one side of the tape media 315. The stop plate 350 includes a top wall 351 and a plurality of side walls 352-355 (four are shown). One or more of the side walls 352-355 can have a slot 357 formed therein, such as to receive the tape media 315 and/or the voice coil motor 125, for example.

The top wall 351 of the stop plate 350 spans the tape media 315, the first reel 310, and the second reel along 320 the reeling direction RD1 and a reference direction RF1 that is perpendicular to the reeling direction RD1. In one or more embodiments, the first reel 310 and/or the second reel 320 are mounted at stationary positions relative to the casing 105. In one or more embodiments, the first reel 310 and/or the second reel 320 are laterally movable relative to a side wall 111 of the casing 105. The stop plate 350 can be mounted to the casing 105, such as mounted to the cover 150 of the casing 105. The stop plate 350 includes one or more guide tracks 358 (one is shown in FIG. 3C), and the first spindle 316 and the second spindle 326 are received in the one or more guide tracks 358. In the implementation shown in FIG. 3C, the one or more guide tracks 358 are formed in the top wall 351.

Figure 4:
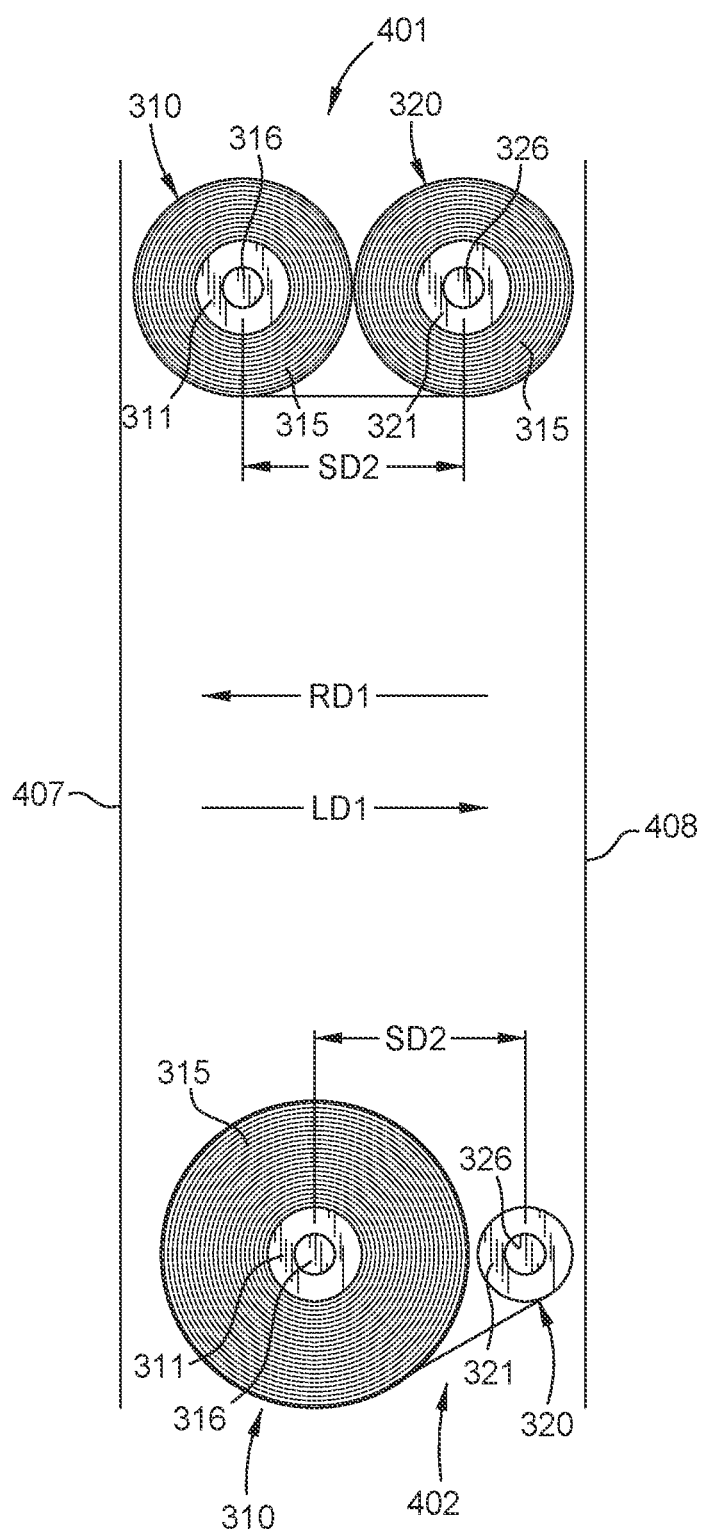
FIG. 4 shows a lateral movement of the tape assembly 300 shown in FIGS. 3A-3C, according to one implementation.

FIG. 4 shows a lateral movement of the tape assembly 300 shown in FIGS. 3A-3C, according to one implementation. FIG. 4 shows a lateral shift resulting from lateral movement between a 50:50 position 401 and a loaded position 402. The first reel 310 and the second reel 320 are laterally moved while a recording operation is conducted that transfers tape media 315 from the second reel 320 and to the first reel 310. A first boundary 407 represents a first side wall 111 and a second boundary 408 represents a second side wall 111 that opposes the first side wall 111 along the x-dimension 331.

During the lateral movement, the first reel 310 moves away from the first boundary 407 and the second reel 320 moves toward the second boundary 408.

The first reel 310 and/or the second reel 320 are laterally moved in a lateral direction LD1 that is opposite of the reeling direction RD1. In the implementation shown in FIG. 4, the first reel 310 and the second reel 320 are moved in the lateral direction LD1 at a substantially equal lateral speed, such as within a difference of 5% or less. In the implementation shown in FIG. 4, the first reel 310 and the second reel 320 are laterally moved substantially simultaneously such that the spindle distance SD2 between the first spindle and the second spindle is substantially constant (e.g., within a difference of 5% or less) throughout the lateral movement between the 50:50 position 401 and the loaded position 402.

The present disclosure contemplates that the first reel 310 and the second reel 320 could laterally move at different lateral speeds, or one reel 310 or 320 could laterally move while the other reel 310 or 320 remains laterally stationary.

Figure 5:
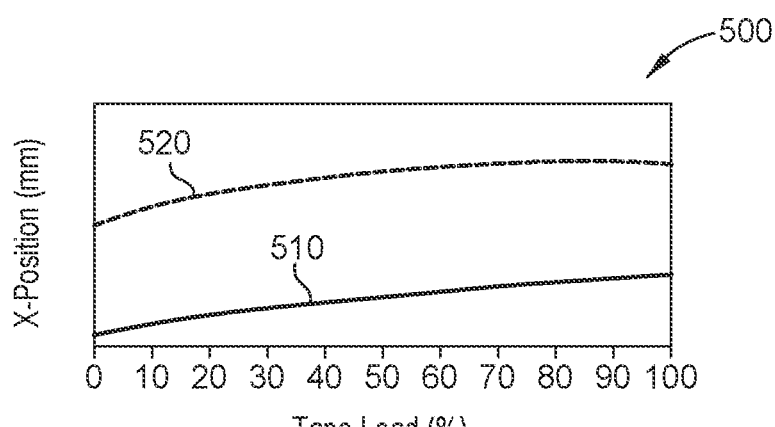
FIG. 5 is a schematic graphical view of a graph 500 showing movement of the first reel 310 and the second reel 320, according to one implementation.

FIG. 5 is a schematic graphical view of a graph 500 showing movement of the first reel 310 and the second reel 320, according to one implementation.

A first profile 510 corresponds to the first reel 310 shown in FIGS. 3A-3C, and a second profile 520 corresponds to the second reel 320 shown in FIGS. 3A-3C. The horizontal axis represents the tape load percentage of the first or second reel 310 or 320. The vertical axis represents the position of the respective first or second spindle 316 or 326 along the x-dimension 331. As shown by the first and second profiles 510, 520, the first reel 310 and the second reel 320 are laterally moved at different lateral speeds. The lateral movement of the first reel 310 and the second reel 320 can be moved to correspond to the same first or second profile 510 or 520 such that the first and second reels 310, 320 are laterally moved at a substantially equal lateral speed.

Figure 6:
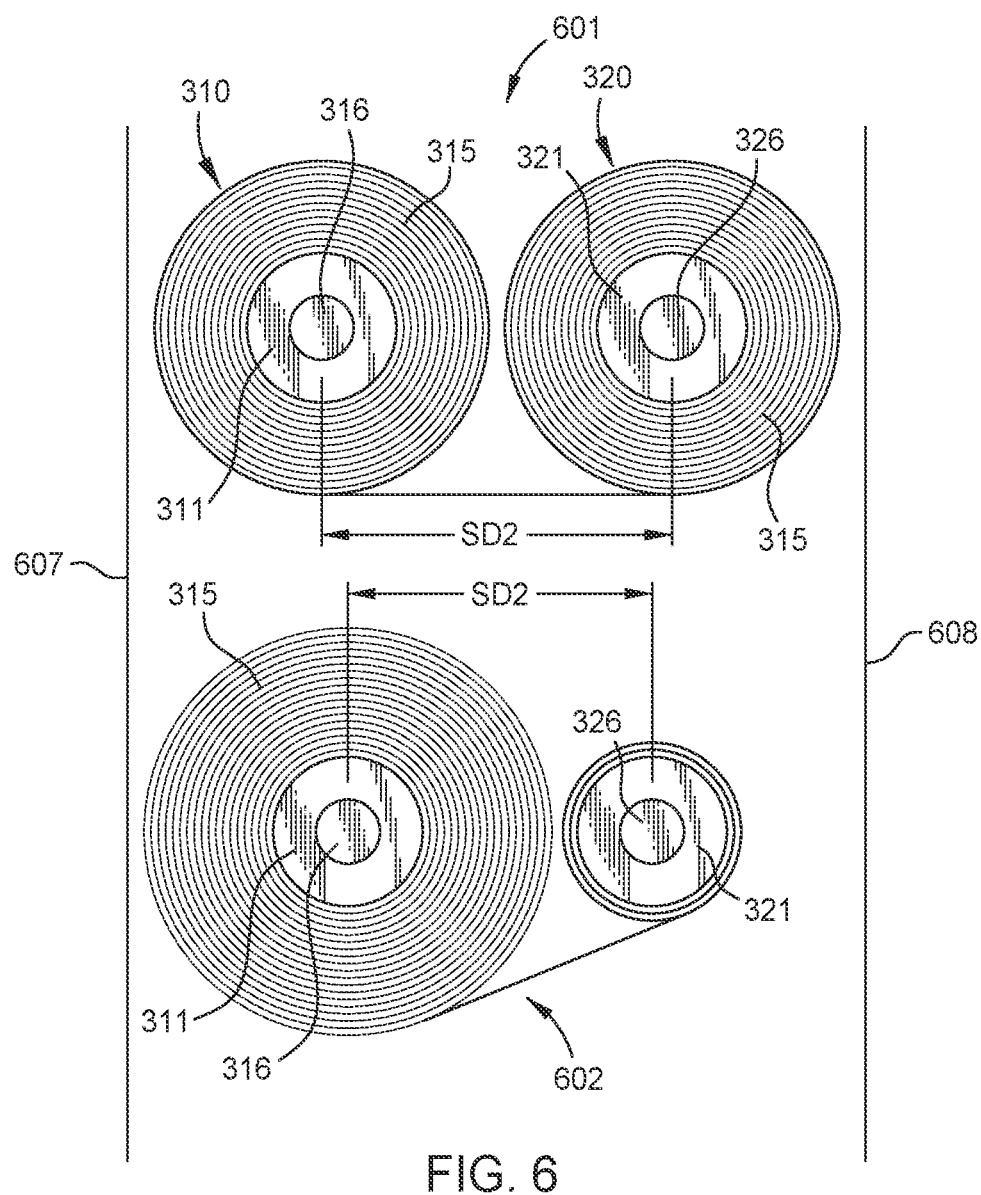
FIG. 6 shows a lateral movement of the tape assembly 300 shown in FIGS. 3A-3C, according to one implementation.

FIG. 6 shows a lateral movement of the tape assembly 300 shown in FIGS. 3A-3C, according to one implementation. FIG. 6 shows a lateral shift resulting from lateral movement between a 50:50 position 601 and a loaded position 602. The first reel 310 and the second reel 320 are laterally moved while a recording operation is conducted that transfers tape media 315 from the second reel 320 and to the first reel 310. A first boundary 607 represents a first side wall 111 and a second boundary 608 represents a second side wall 111 that opposes the first side wall 111 along the x-dimension 331. During the lateral movement, the first reel 310 moves away from the first boundary 607 and the second reel 320 moves away from the second boundary 608. That is, the first reel 310 and the second reel 320 move in lateral directions that are opposite of each other.

The first reel 310 and the second reel 320 can be laterally moved at a substantially equal lateral speed (such as within a difference of 5% or less), or at different lateral speeds. The present disclosure contemplates that the first reel 310 can be laterally moved while the second reel 320 remains stationary laterally.

In the implementation shown in FIG. 6, the lateral movement of the first reel 310 and/or second reel 320 varies (e.g., reduces) the spindle distance SD2.

Figure 7A:
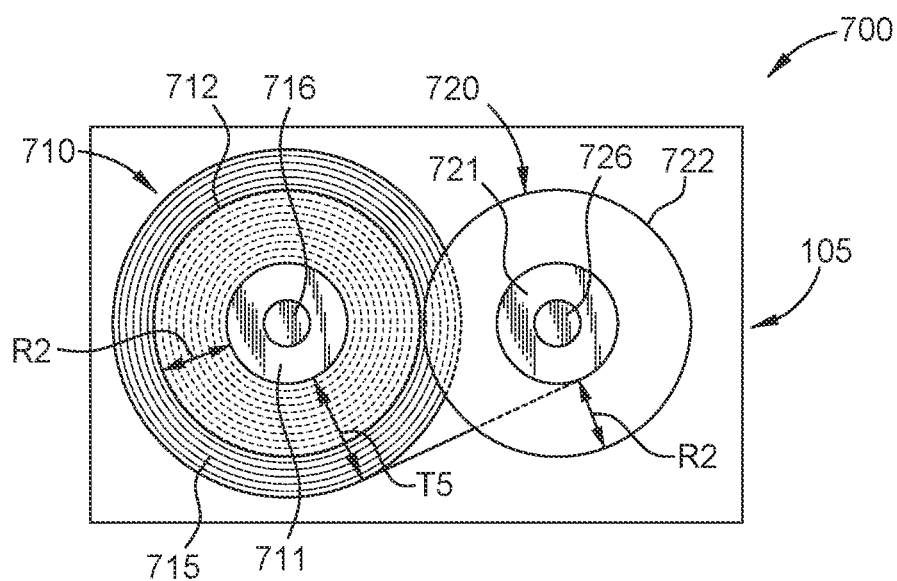
FIGS. 7A and 7B are schematic top views of a tape assembly 700 having reels 710, 720, according to one implementation.
Figure 7B:
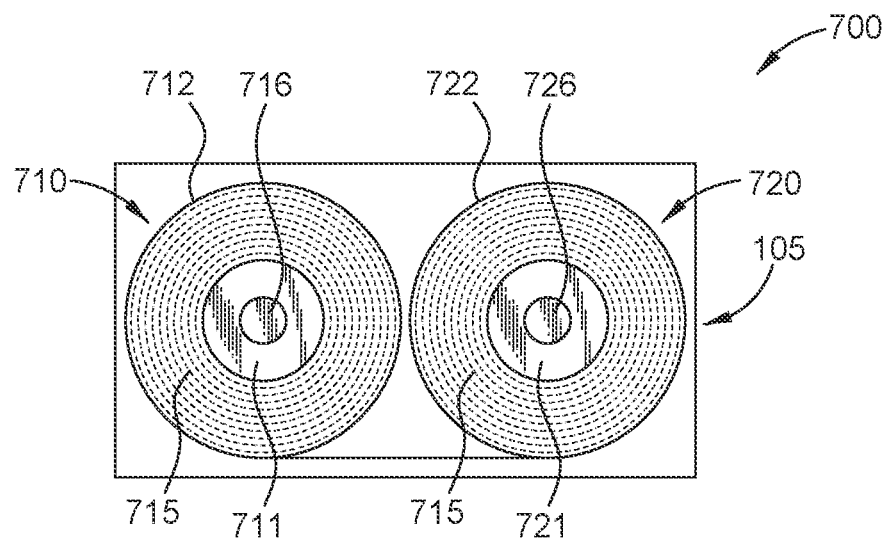

FIGS. 7A and 7B are schematic top views of a tape assembly 700 having reels 710, 720, according to one implementation. The first reel 710 and the second reel 720 each includes a hub 711, 721 mounted to the respective first spindle 716 or second spindle 726. The first reel 710 and the second reel 720 each includes one or more flanges 712 or 722 extending relative to the hub 711 or 721. The one or more flanges 712, 722 have a flange radius R2 that is smaller than a tape load thickness T5. The tape load thickness T5 is defined by a loaded position (shown for the first reel 710 in FIG. 7A) where tape media 715 is completely reeled onto the respective first reel 710 or second reel 720.

Each reel 710, 720 can have a single flange 712 or 722 or two flanges 712 or 722 on both sides of the respective hub 711 or 721. In one or more embodiments, the flange radius R2 is less than 10 mm, such as 5 mm or less.

The flange radius R2 is a ratio RAT of the tape load thickness T5. In one or more embodiments, the first and second reels 710, 720 are laterally moved at a substantially equal lateral speed, and the ratio RAT is 0.5 or less.

Figure 8A:
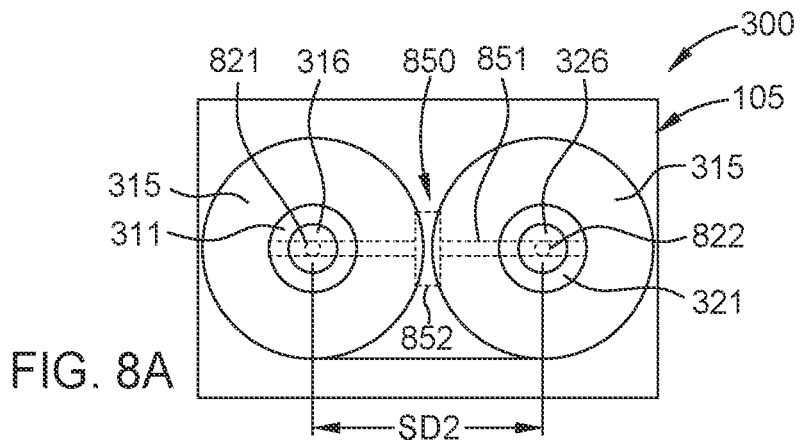
FIGS. 8A-8C are schematic top views of the tape assembly 300 shown in FIGS. 3A-3C, according to one implementation.
Figure 8B:
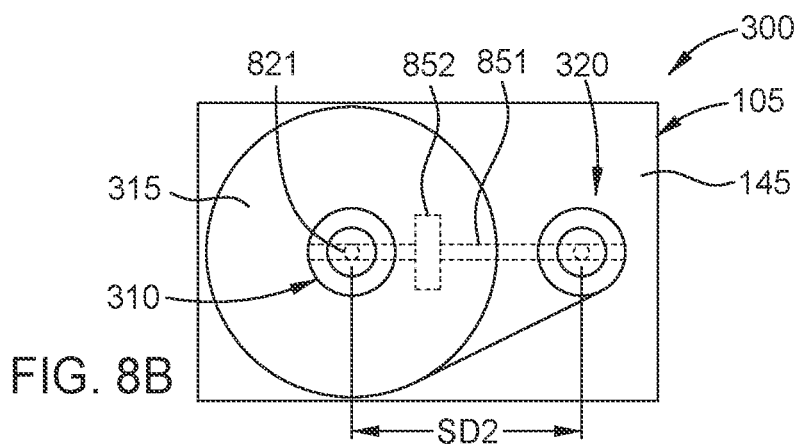
Figure 8C:
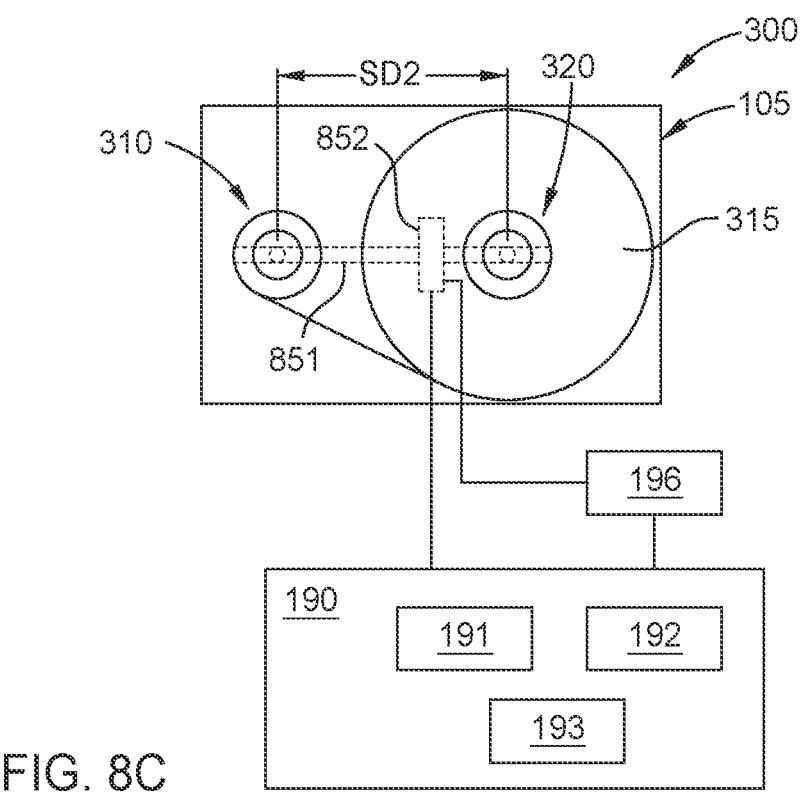

FIGS. 8A-8C are schematic top views of the tape assembly 300 shown in FIGS. 3A-3C, according to one implementation. In the implementation shown in FIGS. 8A-8C, the tape assembly 300 includes a drive assembly 850 configured to laterally move the first reel 310 and the second reel 320. FIG. 8A shows the 50:50 position. FIG. 8B shows the first reel 310 in the loaded position. FIG. 8C shows the second reel 320 in the loaded position.

The drive assembly 850 includes a common linear actuator 851 and a drive motor 852 configured to drive the common linear actuator 851. The drive motor 852 drives the common linear actuator 851 by rotating a component of the drive motor 852. In one or more embodiments, the drive motor 852 is a stepper motor, and the common linear actuator 851 is a screw having threads that are threaded into threads of the component of the drive motor 852. In one or more embodiments, the drive motor 852 remains stationary laterally relative to the casing 105 while the common linear actuator 851 translates between the positions shown in FIG. 8A, FIG. 8B, and FIG. 8C. As the common linear actuator 851 translates, the first reel 310 and the second reel 320 laterally move relative to the casing 105. The drive motor 852 can be mounted to the casing 105, such as mounted to the base 145 of the casing 105. The spindle distance SD2 is substantially constant as the first reel 310 and the second reel 320 move between the positions shown in FIG. 8A, FIG. 8B, and FIG. 8C. The drive motor 852 is aligned between the first reel 310 and the second reel 320. The first spindle 316 is mounted to the common linear actuator 851 at a first connection point 821 and the second spindle 326 is mounted to the common linear actuator 851 at a second connection point 822 such that lateral movement of the common linear actuator 851 laterally moves the first reel 310 and the second reel 320.

Figure 9A:
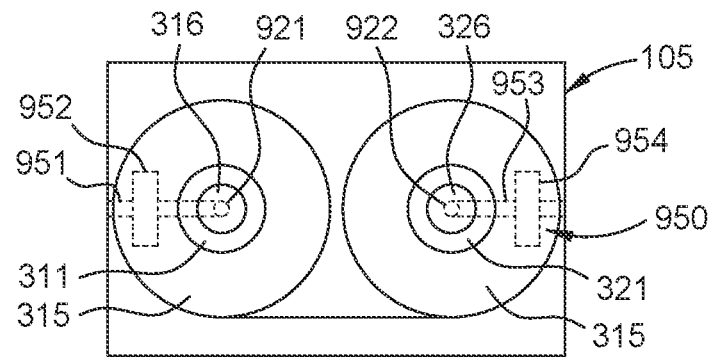
FIGS. 9A and 9B are schematic top views of the tape assembly 300 shown in FIGS. 3A-3C, according to one implementation.
Figure 9B:
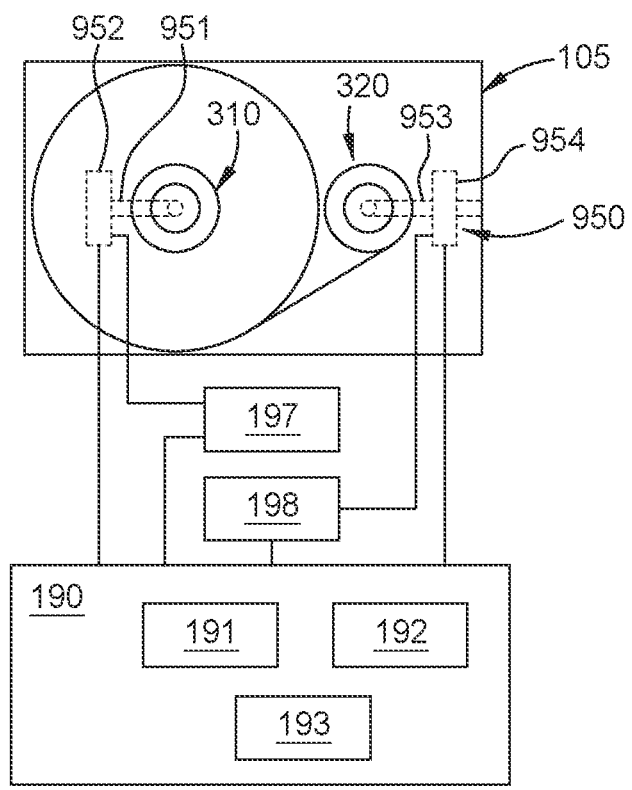

FIGS. 9A and 9B are schematic top views of the tape assembly 300 shown in FIGS. 3A-3C, according to one implementation. In the implementation shown in FIGS. 9A and 9B, the tape assembly 300 includes a drive assembly 950 configured to laterally move the first reel 310 and the second reel 320. FIG. 9A shows the 50:50 position. FIG. 9B shows the first reel 310 in the loaded position.

The drive assembly 950 includes a first linear actuator 951, a second linear actuator 953, a first drive motor 952 configured to drive the first linear actuator 951, and a second drive motor 954 configured to drive the second linear actuator 953. The first spindle 316 is mounted to the first linear actuator 951 at a first connection point 921 and the second spindle 326 is mounted to the second linear actuator 953 at a second connection point 922. The drive motors 952, 954 of the drive assembly 950 are used to independently move the first reel 310 and the second reel 320. The lateral movement between FIG. 9A and FIG. 9B shows that the first drive motor 952 drives the first linear actuator 951 to move the first reel 310 while the second linear actuator 953 is not drive such that the second reel 320 remains stationary laterally relative to the casing 105.

In FIG. 9A, a portion of the first linear actuator 951 extends relative to both sides of the first drive motor 952. In FIG. 9B, the first drive motor 952 is fully actuated such that the first linear actuator 951 is fully extended.

Figure 10A:
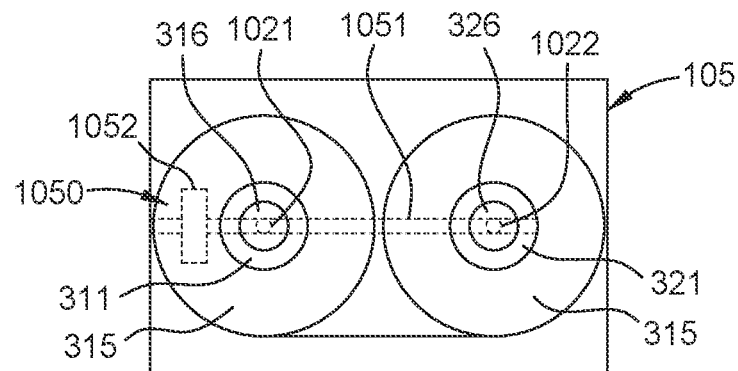
FIGS. 10A and 10B are schematic top views of the tape assembly 300 shown in FIGS. 3A-3C, according to one implementation.
Figure 10B:
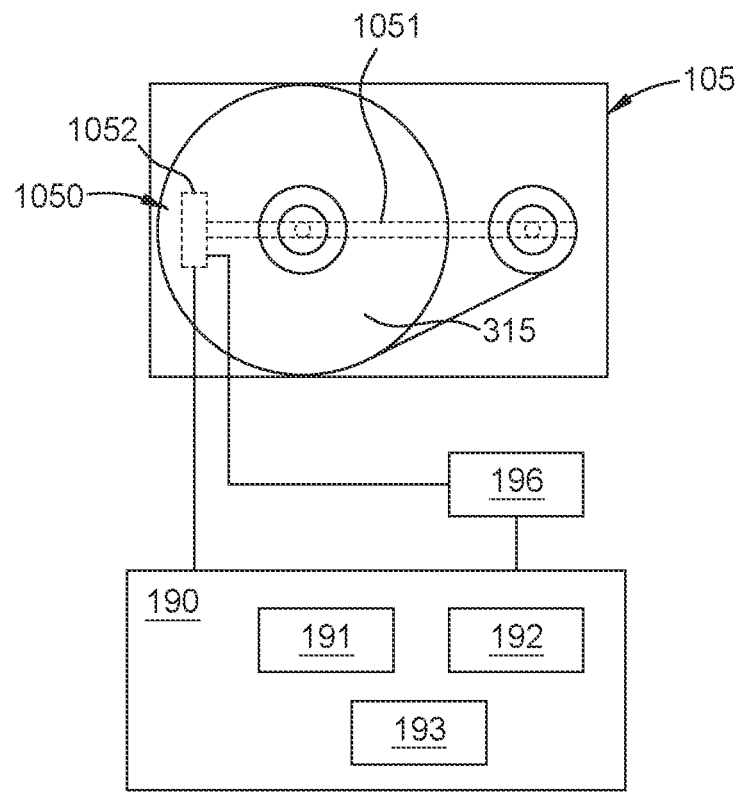

FIGS. 10A and 10B are schematic top views of the tape assembly 300 shown in FIGS. 3A-3C, according to one implementation. In the implementation shown in FIGS. 10A and 10B, the tape assembly 300 includes a drive assembly 1050 configured to laterally move the first reel 310 and the second reel 320 substantially simultaneously. FIG. 10A shows the 50:50 position. FIG. 10B shows the first reel 310 in the loaded position.

The drive assembly 1050 includes a common linear actuator 1051 and a drive motor 1052 configured to drive the common linear actuator 1051.

In FIG. 10A, a portion of the common linear actuator 1051 extends relative to both sides of the drive motor 1052. In FIG. 10B, the drive motor 1052 is fully actuated such that the common linear actuator 1051 is fully extended. The first spindle 316 is mounted to the common linear actuator 1051 at a first connection point 1021 and the second spindle 326 is mounted to the common linear actuator 1051 at a second connection point 1022 such that lateral movement of the common linear actuator 1051 laterally moves the first reel 310 and the second reel 320.

Figure 11:
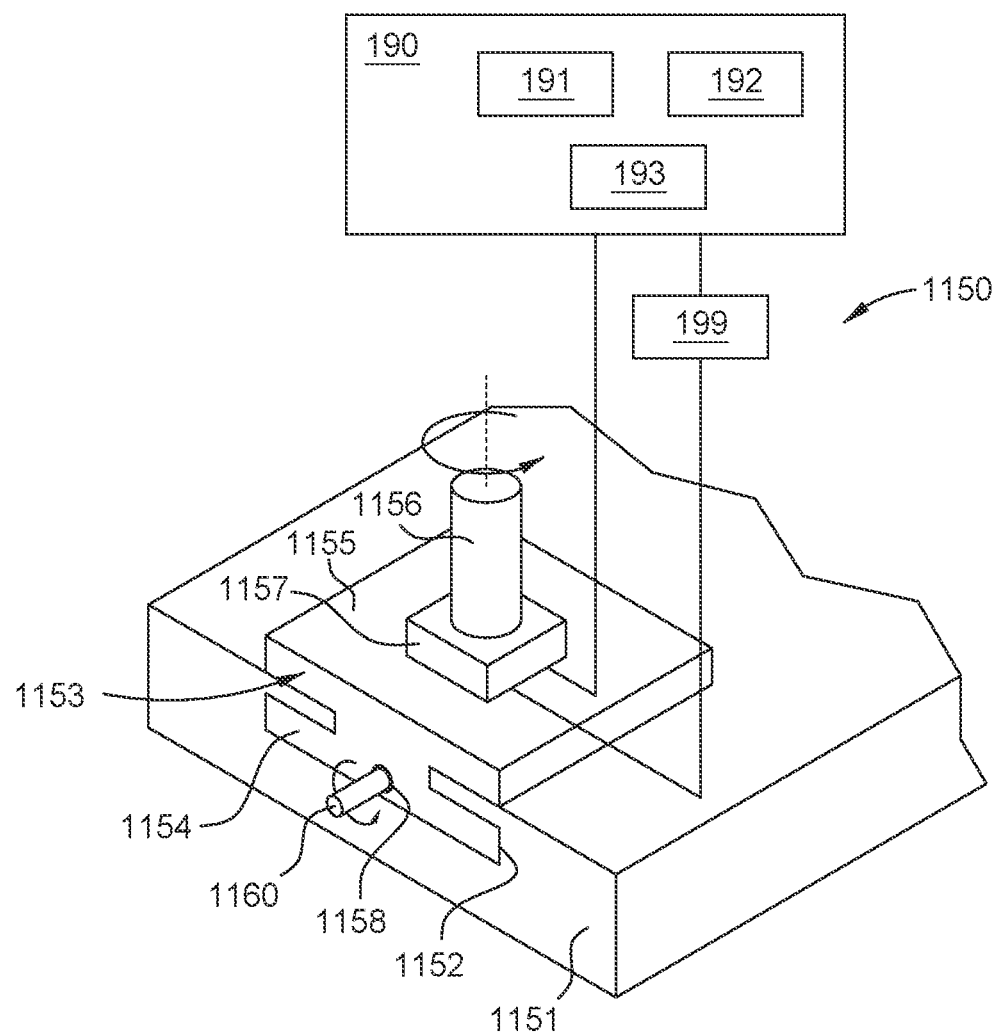
FIG. 11 is a schematic partial perspective view of a drive assembly 1150, according to one implementation.

FIG. 11 is a schematic partial perspective view of a drive assembly 1150, according to one implementation. The drive assembly 1150 includes a baseplate 1151 mounted to the casing 105 (such as mounted to the base 145). The baseplate 1151 includes one or more guide tracks 1152.

The drive assembly 1150 includes a spindle stage 1153 received in the one or more guide tracks 1152. A spindle 1156 is mounted to the spindle stage 1153. A spindle motor 1157 is configured to rotate the spindle 1156. The spindle stage 1153 includes a shoulder plate 1154 received in a guide track 1152, and a mount plate 1155. A linear actuator 1160 extends at least partially through an opening 1158 formed in the shoulder plate 1154 of the spindle stage 1153. A device, such as a lock ring, can be used to fix the spindle stage 1153 relative to the linear actuator 1160 such that lateral movement of the linear actuator 1160 laterally translates the spindle stage 1153.

The present disclosure contemplates that aspects described in relation to FIG. 11 can be used in relation to various implementations of the present disclosure. As an example, a drive assembly can include a first spindle stage 1153 received in the one or more guide tracks 1152, where the first spindle 316 is mounted to the first spindle stage 1153; and a second spindle stage 1153 received in the one or more guide tracks 152, where the second spindle 326 is mounted to the second spindle stage 1153. Such an example includes a first spindle motor 1157 configured to rotate the first spindle 316, and a second spindle motor 1157 configured to rotate the second spindle 326. The linear actuator 1160 can be a common linear actuator, or there can be two of the linear actuator 1160 (a first to drive the first reel 310 and a second to drive the second reel 320).

Figure 12:
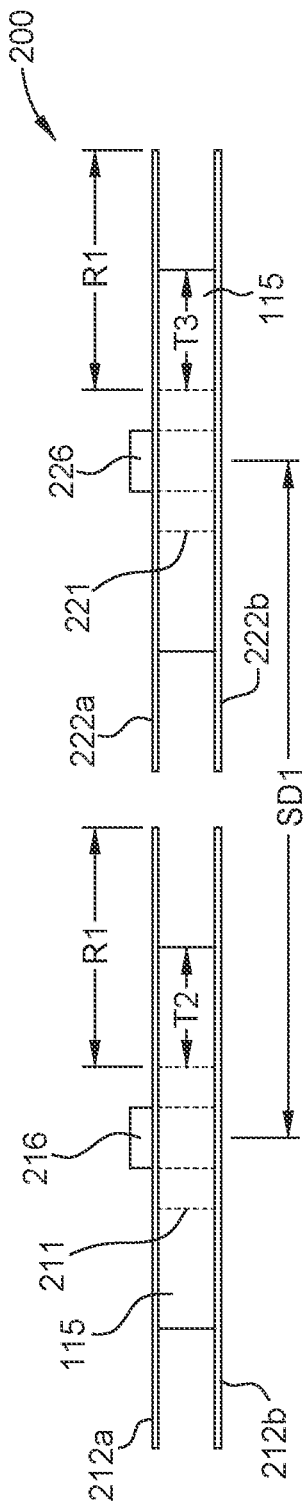
FIG. 12 is a schematic side view of the first reel 210 and the second reel 220 shown in FIG. 28, according to one implementation.

FIG. 12 is a schematic side view of the first reel 210 and the second reel 220 shown in FIG. 2B, according to one implementation. The first hub 211 includes two first flanges 212a, 212b and the second hub 221 includes two second flanges 222a, 222b.

Figure 13:
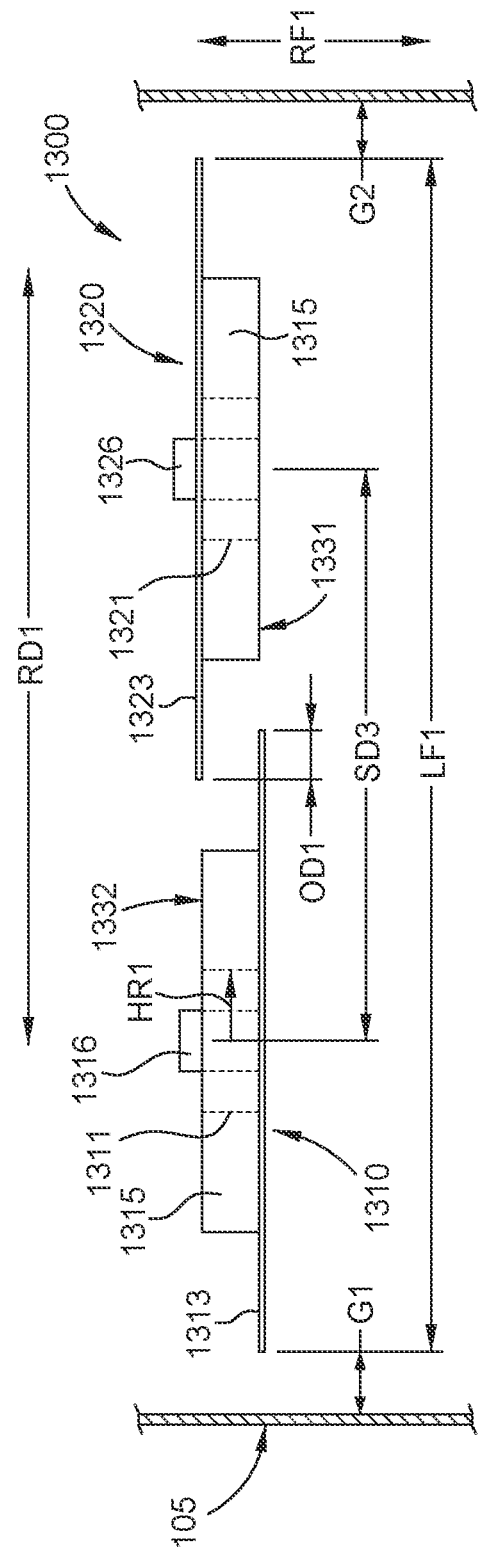
FIG. 13 is a schematic side view of a tape assembly 1300, according to one implementation.

FIG. 13 is a schematic side view of a tape assembly 1300, according to one implementation. The tape assembly 1300 includes a first reel 1310 mounted to a first spindle 1316 within the casing 105. The first reel 1310 is rotatable and is mounted at a first position that is stationary relative to the casing 105. The tape assembly 1300 includes a second reel 1320 mounted to a second spindle 1326 within the casing 105. The second reel 1320 is rotatable and is mounted at a second position that is stationary relative to the casing 105. The tape assembly 1300 includes a tape media 1315 wound at least partially about the first reel 1310 and/or the second reel 1320. Rotation of one or more of the first reel 1310 and/or the second reel 1320 transfers the tape media 1315 between the first reel 1310 and the second reel 1320 in a reeling direction RD1.

The first reel 1310 includes a first hub 1311 mounted to the first spindle 1316, and a single flange 1313 extending relative to the first hub 1311. The second reel 1320 includes a second hub 1321 mounted to the second spindle 1326, and a single flange 1323 extending relative to the second hub 1321.

The single flange 1313 of the first reel 1310 is disposed on a first side 1331 of the tape media 1315 and the single flange 1323 of the second reel 1320 is disposed on a second side 1332 of the tape media 1315. The single flange 1313 of the first reel 1310 overlaps with the single flange 1323 of the second reel 1320 in a reference direction RF1 that is perpendicular to the reeling direction RD1. The single flange 1313 of the first reel 1310 overlaps with the single flange 1323 of the second reel 1320 by an overlap distance OD1.

A lateral footprint LF2 of the first reel 1310, the second reel 1320, and the tape media 1315 is less than 120 mm, and the lateral footprint LF2 is measured parallel to the reeling direction RD1. In one or more embodiments, the lateral footprint LF2 is 117 mm or less. The single flange 1313 of the first reel 1310 is positioned at a first gap G1 relative to a first side wall 111 of the casing 105. The single flange 1323 of the second reel 1320 is positioned at a second gap G2 relative to a second side wall 111 of the casing 105.

The first gap G1 and the second gap G2 are both less than 3.0 mm, such as 2.0 mm. In one or more embodiments, the first gap G1 and the second gap G2 are both 1.0 mm or less. The first position of the first spindle 1316 is spaced from the second position of the second spindle 1326 by a spindle distance SD3. The spindle distance SD3 is substantially equal to a distance value DV, and the distance value DV is determined by adding a first value V1 and a second value V2 together. The first value V1 is equal to a hub radius HR1 of the first hub 1311 multiplied by a factor of 2.0. The second value V2 is equal to a tape load thickness. The tape load thickness is defined by a loaded position where the tape media 1315 is completely reeled onto the respective first reel 1310 or second reel 1320.

The single flange 1313 of the first reel 1310 and/or the single flange 1323 of the second reel 1320 are coated with a friction-reducing coating. In one or more embodiments, the friction-reducing coating is formed of graphene. The present disclosure contemplates that other material(s) can be used for the friction-reducing coating.

As shown in FIG. 13, the tape assembly 1300 exhibits a spindle distance SD3 that is smaller than the spindle distance SD1 shown in FIG. 12, and a lateral footprint LF2 that is smaller than a lateral footprint shown in FIG. 12. The smaller spindle distance SD3 and smaller lateral footprint LF2 facilitate more compact and more economical magnetic recording devices (such as tape embedded drives (TEDs)).

Figure 14:
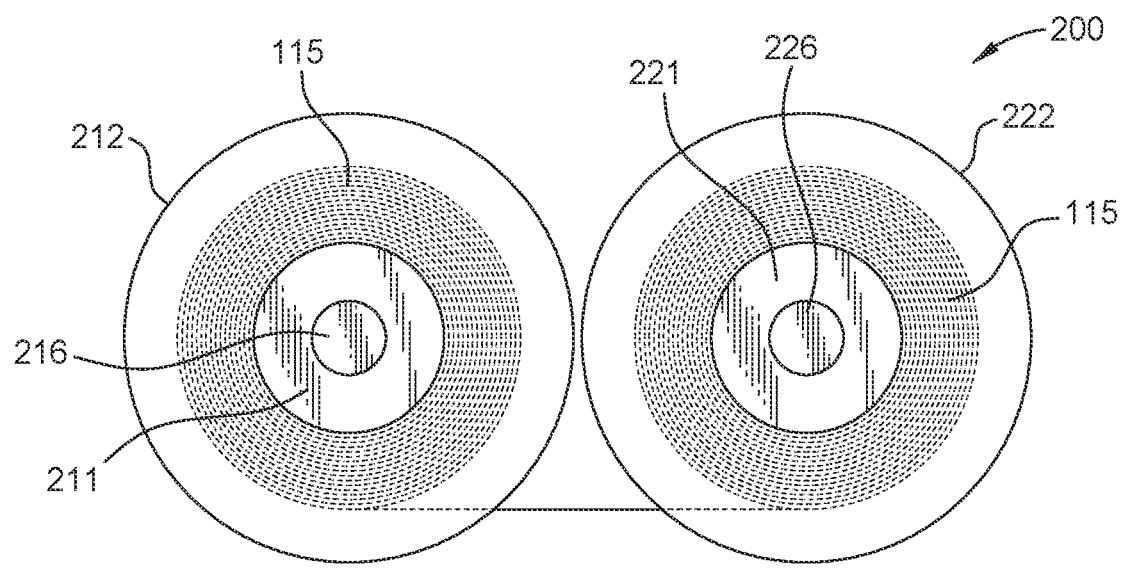
FIG. 14 is a schematic top view of the tape assembly 200 shown in FIG. 12, according to one implementation.

FIG. 14 is a schematic top view of the tape assembly 200 shown in FIG. 12, according to one implementation.

Figure 15:
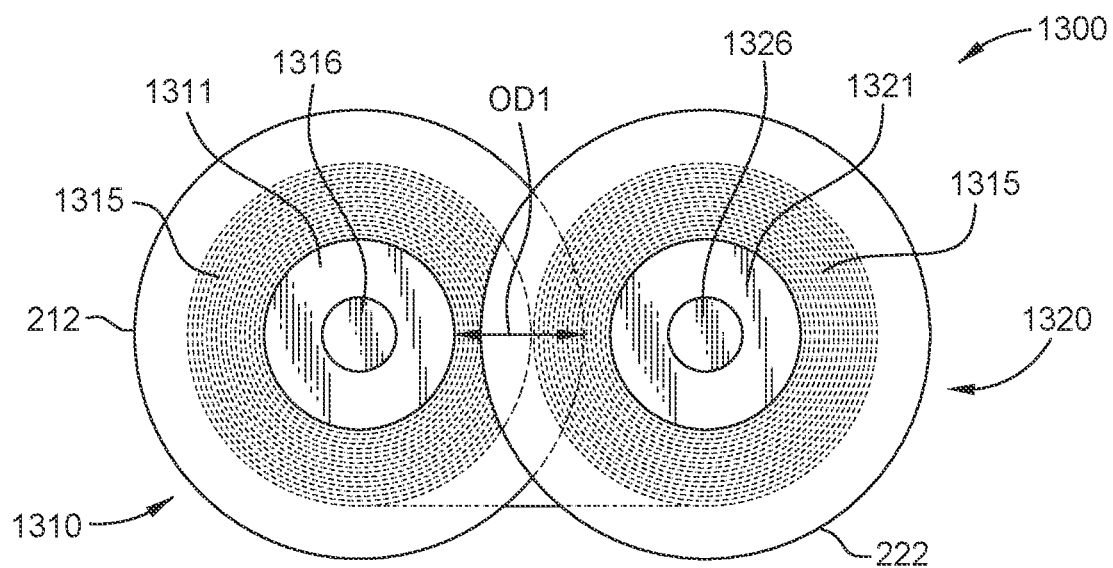
FIG. 15 is a schematic top view of the tape assembly 1300 shown in FIG. 13, according to one implementation.

FIG. 15 is a schematic top view of the tape assembly 1300 shown in FIG. 13, according to one implementation.

As shown in FIGS. 13 and 15, the tape assembly 1300 exhibits a spindle distance SD3 that is smaller than the spindle distance SD1 shown in FIGS. 12 and 14, and a lateral footprint LF2 that is smaller than a lateral footprint shown in FIGS. 12 and 14. The smaller spindle distance SD3 and smaller lateral footprint LF2 facilitate more compact and more economical magnetic recording devices (such as tape embedded drives (TEDs)).

Figure 16:
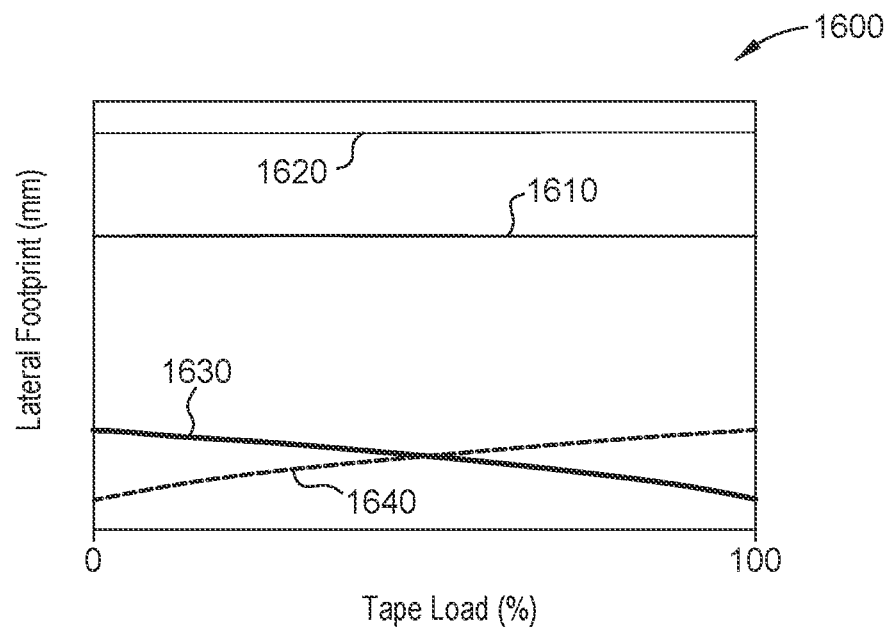
FIG. 16 is a schematic graphical view of a graph 1600 comparing lateral footprints of reel arrangements, according to one implementation.

FIG. 16 is a schematic graphical view of a graph 1600 comparing lateral footprints of reel arrangements, according to one implementation.

A first profile 1610 corresponds to the substantially simultaneous movement of the first reel 310 and the second reel 320, as shown in FIG. 4. A second profile 1620 corresponds to the first reel 210 and the second reel 220 shown in FIGS. 2A and 2B. A third profile 1630 corresponds to the first reel 310 that is initially in the loaded position, as shown in FIG. 3A. A fourth profile 1640 corresponds to the second reel 320 that is initially in an unloaded position, as shown in FIG. 3A.

The horizontal axis represents the tape load percentage of the second reel 220 and the second reel 320. The vertical axis represents the lateral footprint. For the first profile 1610 the lateral footprint is of both the first reel 310 and the second reel 320. For the second profile 1620 the lateral footprint is of both the first reel 210 and the second reel 220. For the third profile 1630 the lateral footprint is of the first reel 310. For the fourth profile 1640 the lateral footprint is of the second reel 320.

As shown by the first profile 1610 in relation to the second profile 1620, moving one or more of the first reel 310 and/or the second reel 320 (such as in a substantially simultaneous manner) facilitates a reduced lateral footprint throughout recording operations that transfer tape media between the reels.

The present disclosure contemplates that one or more mitigation operations may be used when a flangeless hub is used, when a single flange hub is used, and/or when a tape thickness exceeds a flange radius of flange(s). The one or more mitigation operations facilitate reducing misalignment of the tape media with various components and/or facilitate reducing deformation (such as bending) of the tape media.

The mitigation operation(s) include one or more of: translationally moving one or more of the guides/rollers 15a, 135b (such as parallel to the reference direction RD1), translationally moving the head assembly 130 (such as parallel to the reference direction RD1), specifying certain material(s) for flanges of the hubs, and/or using one or more friction-reducing coatings on flanges of the hubs.

Figure 17:
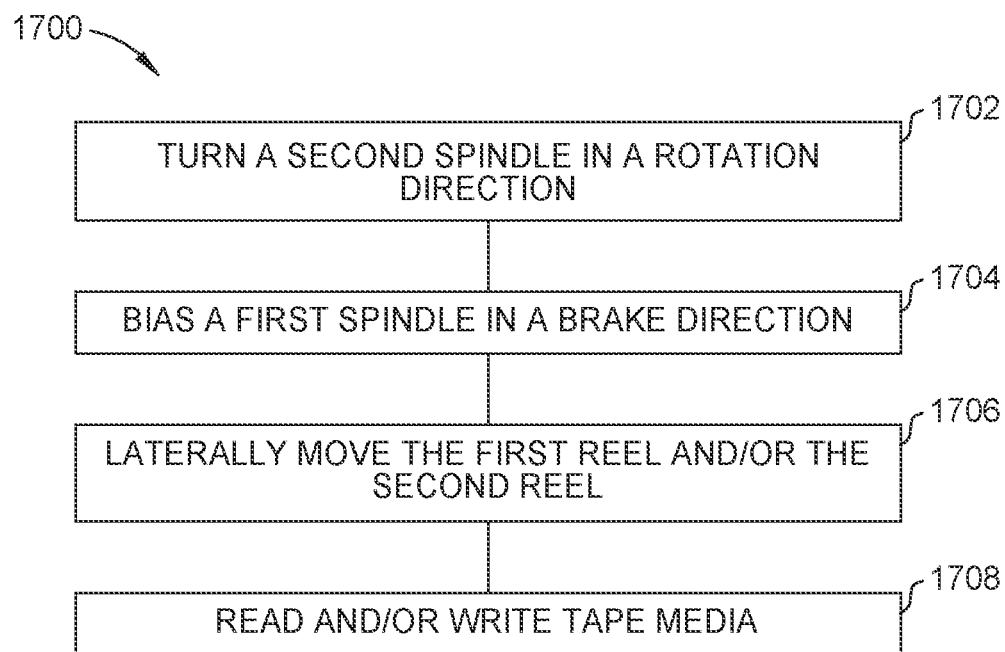
FIG. 17 is a schematic block diagram view of a method 1700 of conducting a recording operation, according to one implementation.

FIG. 17 is a schematic block diagram view of a method 1700 of conducing a recording operation, according to one implementation. In the implementation described, the method 1700 transfers (in a reeling direction) tape media from a first reel and to a second reel of a tape embedded drive (TED). The first reel is mounted to a first spindle and the second reel is mounted to a second spindle. A first spindle motor is configured to rotate the first spindle and a second spindle motor is configured to rotate the second spindle.

Operation 1702 includes turning the second spindle in a rotation direction. The turning of the second spindle includes instructing the second spindle motor to turn the second spindle in the rotation direction, and instructing a power source to supply power to the second spindle motor.

Operation 1704 includes biasing the first spindle in a brake direction. The turning of the first spindle includes instructing the first spindle motor to turn the first spindle in the brake direction, and instructing a power source to supply power to the first spindle motor.

Operation 1706 includes, while turning the second spindle in the rotation direction, laterally moving one or more of the first reel and/or the second reel in a lateral direction that is opposite of the reeling direction. In one or more embodiments, the first reel and the second reel are both moves substantially simultaneously and at a substantially equal speed such that a spindle distance between the first spindle and the second spindle is substantially constant throughout the lateral movement.

The laterally moving of the first reel and/or the second reel includes driving one or more linear actuators using one or more drive motors. The linear translation of the one or more linear actuators moves the first reel and/or the second reel in the lateral direction.

The driving of the one or more linear actuators includes instructing one or more drive motors to rotate a component in the lateral direction, and instructing a power source to supply power to the one or more drive motors. In one or more embodiments, a common linear actuator is coupled to move both the first reel and the second reel, and a single drive motor drives the common linear actuator. In one or more embodiments, a first linear actuator is coupled to move the first reel and is driven by a first drive motor, a second linear actuator is coupled to move the second reel and is driven by a second drive motor, and a power source is instructed to supply a substantially equal power to each of the first drive motor and the second drive motor.

Operation 1708 includes one or more of reading and/or writing sectors of the tape media that is being transferred from the first reel and to the second reel. At least part of operation 1708 can be conducted simultaneously with at least part of each of operations 1702, 1704, and/or 1706.

The present disclosure contemplates that the power source referenced in relation to operations 1702, 1704, and 1706 can be a single integrated power source or two or more power sources. The power source referenced in relation to operations 1702, 1704, and 1706 can be integrated with one or more motors (such as the spindle motor(s) and/or the drive motor(s)).

The implementations described herein include a controller 190 configured to control various features to conduct the operations described. The controller 190 includes a central processing unit (CPU) 191, a memory 192 containing instructions, and support circuits 193 for the CPU 191. The controller 190 controls the spindle motors and the drive motor(s) directly, or via other computers and/or controllers. In one or more embodiments, each spindle motor and drive motor includes a dedicated controller in communication with the controller 190, and the controller 190 functions as a central controller.

The controller 190 is of any form of a general-purpose computer processor that is used in an industrial setting for controlling various TED's and equipment, and sub-processors thereon or therein. The memory 192, or non-transitory computer readable medium, is one or more of a readily available memory such as random access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)), read only memory (ROM), floppy disk, hard disk, flash drive, or any other form of digital storage, local or remote. The support circuits 193 are coupled to the CPU 191 for supporting the CPU 191 (a processor). The support circuits 193 include cache, power supplies, clock circuits, input/output circuitry and subsystems, and the like. Operational parameters (such as a lateral movement speed) and operations are stored in the memory 192 as a software routine that is executed or invoked to turn the controller 190 into a specific purpose controller to control the operations of the TEDs, such as the spindle motors and the drive motor(s). The controller 190 is configured to conduct any of the operations of the methods described herein. The instructions stored on the memory 192, when executed, cause one or more of operations 1702-1708 of method 1700 to be conducted.

The various operations described herein (such as the operations 1702-1708 of the method 1700) can be conducted automatically using the controller 190, or can be conducted automatically or manually with certain operations conducted by a user.

The controller 190 is communicatively coupled to the controlled feature(s) and one or more power sources that can supply power to the controller feature(s). In the implementations shown in FIGS. 8A-8C, the controller 190 is communicatively coupled to the drive motor 852 and a power source 196. In the implementations shown in FIGS. 9A-9B, the controller 190 is communicatively coupled to the first drive motor 952, the second drive motor 954, a first power source 197, and a second power source 198. The present disclosure contemplates a single power source could supply power to the first drive motor 952 and the second drive motor 954. In the implementation shown in FIG. 11, the controller 190 is communicatively coupled to the spindle motor 1157 and a power source 199. The present disclosure contemplates that the spindle motor 1157 can correspond to the first spindle 316, and the controller 190 can be communicatively coupled to a second spindle motor corresponding to the second spindle 326, and a second power source. The present disclosure contemplates that a single power source could supply power to the spindle motor 1157 and the second spindle motor. As described above, a single power source could supply power to all the spindle motors and all the drive motors of a TED.

The controller 190 can be disposed within the casing 105 or externally to the casing 105. The controller 190 can be integrated with one or more feature(s) of the TED 100. The controller 190 can be part of the PCBA 155.

Benefits of the present disclosure include increased media capacity (and increased recording capacity) while mitigating or reducing footprints (e.g., x-dimensions, y-dimensions, and z-dimensions) for magnetic recording devices. Benefits of the present disclosure also include simplicity in operation, simplicity in terms of design changes, mitigated or reduced costs, and mitigated or reduced design changes for certain parameters (such as tape thickness). In one or more embodiments, the first and second reels 710, 720 are laterally moved at different lateral speeds, and the ratio RAT is less than 0.5. In one or more examples, the ratio RAT is 0.25 or less, such as 0.125 or less.

It is contemplated that one or more aspects disclosed herein may be combined. Moreover, it is contemplated that one or more aspects disclosed herein may include some or all of the aforementioned benefits.

As an example, it is contemplated that one or more aspects, features, components, operations, and/or properties may be combined for the tape embedded drive 100, the controller 190, the tape assembly 200, the tape assembly 300, the stop plate 350, the substantially simultaneous lateral movement of FIG. 4, the graph 500, the independent lateral movement of FIG. 6, the tape assembly 700, the drive assembly 850, the drive assembly 950, the drive assembly 1050, the drive assembly 1150, the tape assembly 1300, the graph 1600, and/or the method 1700.

Aspects described herein facilitate increased media capacity and recording capacity while mitigating or reducing footprints. As an example, it is believed that laterally moving the first reel and the second reel substantially simultaneously facilitates an increase of recording capacity of 40% or more at a footprint (an x-dimension and a y-dimension) that is the same as or lesser than other implementations. As another example, it is believed that using one or more flangeless reels and/or one or more single flange reels facilitates a 14% reduction in footprint and/or a 17% increase in media capacity relative to other implementations. Such benefits are facilitated in a manner that is simple and cost-effective.

In one embodiment, a magnetic recording device includes a casing and a first reel mounted to a first spindle within the casing. The first reel is rotatable. The magnetic recording device includes a second reel mounted to a second spindle within the casing. The second reel is rotatable. The magnetic recording device includes a tape media wound at least partially about one or more of the first reel or the second reel. Rotation of one or more of the first reel or the second reel transfers the tape media between the first reel and the second reel. One or more of the first reel or the second reel is laterally movable relative to a side wall of the casing. The magnetic recording device includes a controller configured to control lateral movement of the one or more of the first reel or the second reel. In one or more examples, each of the first reel and the second reel has a flangeless hub. The magnetic recording device includes a controller having instructions that, when executed, cause: turning of the second spindle to transfer the tape media from the first reel and to the second reel in a reeling direction, and the one or more of the first reel or the second reel to laterally move in a lateral direction that is opposite of the reeling direction. In one or more examples, both the first reel and the second reel are moved in the lateral direction. The first reel and the second reel are moved in the lateral direction at a substantially equal lateral speed. In one or more examples, the first reel and the second reel each includes a hub mounted to the respective first spindle or second spindle, and one or more flanges extending relative to the hub. The one or more flanges have a flange radius that is smaller than a tape load thickness. The tape load thickness is defined by a loaded position where the tape media is completely reeled onto the respective first reel or second reel. The flange radius is a ratio of the tape load thickness, and the ratio is 0.5 or less. In one or more examples, the first reel and the second reel are moved in the lateral direction at different lateral speeds. The first reel and the second reel each includes a hub mounted to the respective first spindle or second spindle, and one or more flanges extending relative to the hub. The one or more flanges have a flange radius that is smaller than a tape load thickness. The tape load thickness is defined by a loaded position where the tape media is completely reeled onto the respective first reel or second reel. The flange radius is a ratio of the tape load thickness, and the ratio is less than 0.5. In one or more examples, the first reel and the second reel each includes a hub mounted to the respective first spindle or second spindle, and a single flange extending relative to the hub. The single flange of the first reel is disposed on a first side of the tape media and the single flange of the second reel is disposed on a second side of the tape media. The single flange of the first reel overlaps with the single flange of the second reel in a reference direction that is perpendicular to the reeling direction.

In one embodiment, a magnetic recording device includes a casing and a first reel mounted to a first spindle within the casing. The first reel is rotatable. The magnetic recording device includes a second reel mounted to a second spindle within the casing. The second reel is rotatable. The tape media is wound at least partially about one or more of the first reel or the second reel, and rotation of one or more of the first reel or the second reel transfers the tape media between the first reel and the second reel. The magnetic recording device includes a drive assembly configured to laterally move the first reel and the second reel. The magnetic recording device includes a controller having instructions that, when executed, cause the drive assembly to laterally move the first reel and the second reel substantially simultaneously such that a spindle distance between the first spindle and the second spindle is substantially constant. The drive assembly includes a baseplate mounted to the casing, the baseplate having one or more guide tracks. The drive assembly includes a first spindle stage received in the one or more guide tracks. The first spindle is mounted to the first spindle stage. The drive assembly includes a second spindle stage received in the one or more guide tracks. The second spindle is mounted to the second spindle stage. The drive assembly includes a first spindle motor configured to rotate the first spindle, and a second spindle motor configured to rotate the second spindle. In one or more examples, the drive assembly includes a common linear actuator extending at least partially through the first spindle stage and at least partially through the second spindle stage, and a drive motor configured to drive the common linear actuator. The drive motor is a stepper motor, and the common linear actuator is a screw having threads that are threaded into threads of the drive motor. In one or more examples, the drive assembly includes a first linear actuator extending at least partially through the first spindle stage, a second linear actuator extending at least partially through the second spindle stage, a first drive motor configured to drive the first linear actuator, and a second drive motor configured to drive the second linear actuator. In one or more examples, the controller includes instructions that, when executed, cause a power source to supply a substantially equal power to each of the first drive motor and the second drive motor.

In one embodiment, a magnetic recording device includes a casing, reeling means positioned within the casing, and a tape media wound at least partially about the reeling means. The magnetic recording device includes means for laterally moving the reeling means relative to a side wall of the casing.

In one embodiment, a magnetic recording device includes a casing and a first reel mounted to a first spindle within the casing. The first reel is rotatable and is mounted at a first position that is stationary relative to the casing. The magnetic recording device includes a second reel mounted to a second spindle within the casing. The second reel is rotatable and is mounted at a second position that is stationary relative to the casing. The magnetic recording device includes a tape media wound at least partially about one or more of the first reel or the second reel. Rotation of one or more of the first reel or the second reel transfers the tape media between the first reel and the second reel in a reeling direction. The first reel includes a first hub mounted to the first spindle, and a single flange extending relative to the first hub. The second reel includes a second hub mounted to the second spindle, and a single flange extending relative to the second hub. The single flange of the first reel is disposed on a first side of the tape media and the single flange of the second reel is disposed on a second side of the tape media.

The single flange of the first reel overlaps with the single flange of the second reel in a reference direction that is perpendicular to the reeling direction. A lateral footprint of the first reel, the second reel, and the tape media is less than 120 mm, and the lateral footprint measured parallel to the reeling direction. The single flange of the first reel is positioned at a first gap relative to a first side wall of the casing, and the first gap is less than 3.0 mm. The first position is spaced from the second position by a spindle distance. The spindle distance is substantially equal to a distance value, and the distance value is determined by adding a first value and a second value together. The first value is equal to a hub radius of the first hub multiplied by a factor of 2.0, and the second value is equal to a tape load thickness. The tape load thickness is defined by a loaded position where the tape media is completely reeled onto the respective first reel or second reel. The single flange of the first reel is coated with a friction-reducing coating. The friction-reducing coating is formed of graphene.

In one embodiment, a magnetic recording device for magnetic recording devices includes a casing and a first reel mounted to a first spindle within the casing. The first reel is rotatable and includes a first flangeless hub mounted to the first spindle. The magnetic recording device includes a second reel mounted to a second spindle within the casing. The second reel is rotatable and includes a second flangeless hub mounted to the second spindle. The magnetic recording device includes a tape media wound at least partially about one or more of the first reel or the second reel. Rotation of one or more of the first reel or the second reel transfers the tape media between the first reel and the second reel in a reeling direction. In one or more examples, the magnetic recording device includes a stop plate mounted at a stationary position on one side of the tape media. The stop plate spans the tape media, the first reel, and the second reel along the reeling direction and a reference direction that is perpendicular to the reeling direction. The first reel and the second reel are laterally movable relative to a side wall of the casing. The stop plate includes one or more guide tracks. The first spindle and the second spindle are received in the one or more guide tracks.

In one embodiment, a magnetic recording device includes a casing and a reeling means positioned within the casing and mounted at a first position that is stationary relative to the casing. The reeling means includes a first hub and a single extension means extending relative to the first hub. The magnetic recording device includes a tape media wound at least partially about the reeling means.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording device, comprising:
    a casing;
    a first reel mounted to a first spindle within the casing, wherein the first reel is rotatable;
    a second reel mounted to a second spindle within the casing, wherein the second reel is rotatable, wherein the first reel and the second reel each comprises:
        a hub mounted to the respective first spindle or second spindle, and
        one or more flanges extending relative to the hub;
    a tape media wound at least partially about one or more of the first reel or the second reel, wherein rotation of one or more of the first reel or the second reel transfers the tape media between the first reel and the second reel, and one or more of the first reel or the second reel is laterally movable relative to a side wall of the casing, the one or more flanges having a flange radius that is smaller than a tape load thickness, wherein the tape load thickness is defined by a loaded position where the tape media is completely reeled onto the respective first reel or second reel; and
    a controller configured to control lateral movement of the one or more of the first reel or the second reel, wherein the controller has instructions that, when executed, cause:
        turning of the second spindle to transfer the tape media from the first reel and to the second reel in a reeling direction, and
        the one or more of the first reel or the second reel to laterally move in a lateral direction that is opposite of the reeling direction, wherein both the first reel and the second reel are moved in the lateral direction, and the first reel and the second reel are moved in the lateral direction at a substantially equal lateral speed.

2. The magnetic recording device of claim 1, wherein the flange radius is a ratio of the tape load thickness, and the ratio is 0.5 or less.

3. The magnetic recording device of claim 1, wherein the flange radius is a ratio of the tape load thickness, and the ratio is less than 0.5.

4. The magnetic recording device of claim 1, wherein the one or more flanges of each of the first reel and the second reel has:
    a single flange extending relative to the hub, wherein the single flange of the first reel is disposed on a first side of the tape media and the single flange of the second reel is disposed on a second side of the tape media.

5. The magnetic recording device of claim 4, wherein the single flange of the first reel overlaps with the single flange of the second reel in a reference direction that is perpendicular to the reeling direction.

6. A magnetic recording device, comprising:
    a casing;
    a first reel mounted to a first spindle within the casing, wherein the first reel is rotatable;
    a second reel mounted to a second spindle within the casing, wherein the second reel is rotatable;
    a tape media wound at least partially about one or more of the first reel or the second reel, wherein rotation of one or more of the first reel or the second reel transfers the tape media between the first reel and the second reel;
    a drive assembly configured to laterally move the first reel and the second reel, wherein the drive assembly comprises:
        a baseplate mounted to the casing, the baseplate comprising one or more guide tracks,
        a first spindle stage received in the one or more guide tracks, wherein the first spindle is mounted to the first spindle stage,
        a second spindle stage received in the one or more guide tracks, wherein the second spindle is mounted to the second spindle stage,
        a first spindle motor configured to rotate the first spindle,
        a second spindle motor configured to rotate the second spindle,
        a first linear actuator extending at least partially through the first spindle stage, a second linear actuator extending at least partially through the second spindle stage, a first drive motor configured to drive the first linear actuator, and a second drive motor configured to drive the second linear actuator; and a controller having instructions that, when executed, cause the drive assembly to laterally move the first reel and the second reel substantially simultaneously such that a spindle distance between the first spindle and the second spindle is substantially constant.

7. The magnetic recording device of claim 6, wherein the drive assembly further comprises:

a common linear actuator extending at least partially through the first spindle stage and at least partially through the second spindle stage; and a third drive motor configured to drive the common linear actuator.

8. The magnetic recording device of claim 7, wherein the third drive motor is a stepper motor, and the common linear actuator is a screw having threads that are threaded into threads of the third drive motor.

9. The magnetic recording device of claim 6, wherein the controller comprises instructions that, when executed, cause a power source to supply a substantially equal power to each of the first drive motor and the second drive motor.

10. The magnetic recording device of claim 6, wherein the first drive motor is a first stepper motor, the first linear actuator is a first screw having threads that are threaded into threads of the first drive motor, the second drive motor is a second stepper motor, and the second linear actuator is a second screw having threads that are threaded into threads of the second drive motor.

11. A magnetic recording device, comprising:

a casing;

a first reel positioned within the casing;

a second reel positioned within the casing, wherein the first reel and the second reel each comprises:

a hub mounted to the respective first spindle or second spindle, and one or more flanges extending relative to the hub;

a tape media wound at least partially about the reeling means, the one or more flanges having a flange radius that is smaller than a tape load thickness, wherein the tape load thickness is defined by a loaded position where the tape media is completely reeled onto the respective first reel or second reel;

means for turning the second spindle to transfer the tape media from the first reel and to the second reel in a reeling direction;

means for laterally moving one or more of the first reel or the second wheel relative to a side wall of the casing and in a lateral direction that is opposite of the reeling direction, wherein both the first reel and the second reel are moved in the lateral direction, and the first reel and the second reel are moved in the lateral direction at a substantially equal lateral speed.

12. A magnetic recording device, comprising:

a casing;

a first reel mounted to a first spindle within the casing, wherein the first reel is rotatable;

a second reel mounted to a second spindle within the casing, wherein the second reel is rotatable, wherein the first reel and the second reel each comprises:

a hub mounted to the respective first spindle or second spindle, and a single flange extending relative to the hub;

a tape media wound at least partially about one or more of the first reel or the second reel, wherein rotation of one or more of the first reel or the second reel transfers the tape media between the first reel and the second reel, and one or more of the first reel or the second reel is laterally movable relative to a side wall of the casing, wherein the single flange of the first reel is disposed on a first side of the tape media and the single flange of the second reel is disposed on a second side of the tape media; and a controller configured to control lateral movement of the one or more of the first reel or the second reel, wherein the controller has instructions that, when executed, cause:

turning of the second spindle to transfer the tape media from the first reel and to the second reel in a reeling direction, and the one or more of the first reel or the second reel to laterally move in a lateral direction that is opposite of the reeling direction, wherein both the first reel and the second reel are moved in the lateral direction, and the first reel and the second reel are moved in the lateral direction at different lateral speeds.

13. The magnetic recording device of claim 12, wherein the single flange of the first reel overlaps with the single flange of the second reel in a reference direction that is perpendicular to the reeling direction.

\* \* \* \* \*